(12) United States Patent
Öztürk

(10) Patent No.: US 10,935,091 B2
(45) Date of Patent: Mar. 2, 2021

(54) GYROSCOPIC BRAKE DEVICE AND METHOD

(71) Applicant: Erke Erke Arastirmalari Ve Mühendislik A.S., K. Cekmece/Istanbul (TR)

(72) Inventor: Mustafa Naci Öztürk, Istanbul (TR)

(73) Assignee: Erke Erke Arastirmalari Ve Mühendislik A.S., K. Cekmece/Istanbul (TR)

( * ) Notice: Subject to any disclaimer, the term of this patent is extended or adjusted under 35 U.S.C. 154(b) by 282 days.

(21) Appl. No.: 16/318,018

(22) PCT Filed: Jul. 20, 2016

(86) PCT No.: PCT/EP2016/067256
§ 371 (c)(1),
(2) Date: Jan. 15, 2019

(87) PCT Pub. No.: WO2018/014947
PCT Pub. Date: Jan. 25, 2018

(65) Prior Publication Data
US 2019/0293132 A1   Sep. 26, 2019

(51) Int. Cl.
| | |
|---|---|
| *F16D 63/00* | (2006.01) |
| *B60T 1/06* | (2006.01) |
| *B60T 1/10* | (2006.01) |
| *B60T 13/06* | (2006.01) |
| *B60T 1/12* | (2006.01) |
| *F16D 61/00* | (2006.01) |

(Continued)

(52) U.S. Cl.
CPC ............. *F16D 63/00* (2013.01); *B60T 1/062* (2013.01); *B60T 1/10* (2013.01); *B60T 13/06* (2013.01); *B60T 1/12* (2013.01); *F16D 61/00* (2013.01); *F16D 2121/24* (2013.01); *G01C 19/02* (2013.01)

(58) Field of Classification Search
CPC .......... F16D 61/00; F16D 63/00; B60T 1/062; B60T 1/10; B60T 13/06; B60T 1/12; G01C 19/22; G01C 19/18; G01C 19/02; G01C 19/20; Y10T 74/1293; Y10T 74/1282; Y10T 74/1207
USPC ............................................................ 74/5 F
See application file for complete search history.

(56) References Cited

U.S. PATENT DOCUMENTS

| | | | | |
|---|---|---|---|---|
| 2,246,738 | A * | 6/1941 | Lauk ....................... | G01C 19/04 384/245 |
| 2,278,913 | A * | 4/1942 | Carter ..................... | G01C 19/38 74/5.1 |

(Continued)

*Primary Examiner* — Melanie Torres Williams
(74) *Attorney, Agent, or Firm* — Schroeder Law PC

(57) ABSTRACT

A braking device comprising a body mounted for rotation about a first axis; means for rotating the body about the first axis; comprises a second axis, a third axis and a fourth axis, the braking device being configured as to enable the body to further rotate about the second axis and the third axis, the first axis being oriented with respect to the second axis at an alpha angle (α) which is greater than 0 degrees, the second axis being oriented with respect to the fourth axis at a beta angle (β) which is greater than 0 degrees and less than 90 degrees, the third axis being the precession axis about which the precession of the body occurs as a result of rotating the body about the first axis and applying torque to the body about the second axis.

50 Claims, 14 Drawing Sheets

(51) Int. Cl.
*F16D 121/24* (2012.01)
*G01C 19/02* (2006.01)

(56) References Cited

U.S. PATENT DOCUMENTS

| | | | | |
|---|---|---|---|---|
| 2,797,580 A | * | 7/1957 | Taylor | G01C 19/16 |
| | | | | 74/5 F |
| 3,353,413 A | * | 11/1967 | Cohen et al. | G01C 19/22 |
| | | | | 74/5 F |
| 5,437,420 A | * | 8/1995 | Rosen | B64G 1/285 |
| | | | | 244/165 |
| 2016/0018223 A1 | * | 1/2016 | Stryker | G06F 3/0346 |
| | | | | 73/504.18 |

* cited by examiner

GYROSCOPIC BRAKE DEVICE AND METHOD

The present invention relates to a braking device and method, and particularly but not exclusively relates to a gyroscopic braking device and method.

Braking systems are fundamental components of vehicles which are used to reduce the speed of a vehicle or preventing unwanted acceleration of the vehicle, e.g. during traveling downhill. In conventional braking systems, brake pads or shoes are pressed against a rotating disc or drum that is coupled to a wheel of the vehicle. This causes frictional forces to occur on the surface of the corresponding disc or drum. By means of these frictional forces, the kinetic energy of the vehicle is converted into thermal energy and hence reducing the total kinetic energy of the vehicle. Although these conventional braking systems are widely used in vehicles, they have several disadvantages. In particular, the brake pads or shoes wear out as these braking systems are used, and hence they should regularly be replaced. Also as the braking pads and shoes wear out, they release particles of dust in the ambient air causing pollution and possible health problems for individuals. Furthermore, the amount of thermal energy generated in these systems that cannot be dissipated as heat causes the temperature of the friction surfaces to rise rapidly. As the temperature rises above a threshold value, the performance of the braking system reduces drastically. This issue is also known as brake fade.

Overheating of components of braking systems during continuous use is a potential problem for the braking systems that convert kinetic energy into thermal energy. In order to address this problem to a degree, some aerodynamic techniques such as venting the disc in a disc brake or incorporating cooling fins onto the drum in a drum brake can be used to increase the cooling rate of the braking systems. Alternatively or additionally, for applicable systems, an additional cooling system can be provided in order to remove the produced thermal energy from the components of the braking system. This requires increasing the capacity of the cooling system of a vehicle or installing a separate cooling system specifically for the braking system. However, both approaches cause an increase in the cost of the vehicle and also in the weight of the vehicle which can adversely affect the performance of the vehicle. Furthermore, the amount of continuous braking power that can be obtained from these braking systems is limited by the amount of thermal energy that can removed from the braking system, and hence limited by air cooling capacity and/or the capacity of the external cooling system used.

In order to reduce the amount of thermal energy generated, regenerative braking systems can be used. For example, in electrical regenerative systems, some of the kinetic energy of the vehicle is converted into electrical energy by using electric generators or motors, and the obtained energy is stored in batteries or capacitors. However, these systems are complex and they require installation of electric generators/motors, and batteries/capacitors to the vehicle which increase both the cost and the weight of the vehicle. In mechanical regenerative braking systems with a flywheel, on the other hand, the kinetic energy of the vehicle is directly stored in the flywheel. However, the flywheels used in such systems are large and heavy which can adversely affect the dynamics of the vehicle. Also, independent of the type of the regenerative braking system used, the amount of energy that can be stored is limited by the capacity of the energy storage medium, e.g. the capacity of the batteries/capacitors and the maximum safe rotational speed of the flywheel. Therefore, they are not considered as suitable for continuous use.

The present invention therefore seeks to address these issues.

Accordingly it is an object of the present invention to provide an improved braking device and method for obtaining desired amount of continuous braking power without directly converting kinetic energy into thermal energy which helps reducing global warming and environmental pollution.

It is another object of the present invention to provide an improved braking device and method for providing desired amount of constant and continuous braking power.

It is another object of the present invention to provide an improved braking device and method for producing less vibrating braking systems.

It is another object of the present invention to provide an improved braking device and method for producing inexpensive, durable and safe braking systems.

Thus, in accordance with a first aspect of the present invention there is provided a braking device comprising: a body mounted for rotation about a first axis; means for rotating the body about the first axis; a second axis, a third axis and a fourth axis, the braking device being configured as to enable the body to further rotate about the second axis and the third axis, the first axis being oriented with respect to the second axis at an alpha angle which is greater than 0 degrees, the second axis being oriented with respect to the fourth axis at a beta angle which is greater than 0 degrees and less than 90 degrees, the third axis being the precession axis about which the precession of the body occurs as a result of rotating the body about the first axis and applying torque to the body about the second axis, wherein the second axis is allowed to rotate about the fourth axis independently of rotation of the body about the second axis, and the body is allowed to rotate about the second axis independently of rotation of the second axis about the fourth axis; means for connecting a rotation that is desired to be braked about the fourth axis to the body so as to transmit rotation and torque to the body about the second axis; whereby the rotation of the body about the first axis and the torque applied to the body about the second axis together cause the body to further rotate about the third axis, the body rotates about the first axis, the second axis and the third axis simultaneously, the rotation of the body about the first axis and the rotation of the body about the third axis together cause a braking torque to occur about the second axis; thereby to obtain braking torque against the rotation that is desired to be braked about the fourth axis.

One aspect of the invention is that the rotation of the body about the second axis and the rotation of the body about the third axis are observed as if the body rotates about the fourth axis, the rotation of the body about the first axis and the rotation of the body about the third axis together cause a braking torque to occur about the second axis; thereby braking torque against the rotation that is desired to be braked about the fourth axis is obtained.

The braking device may provide a continuous, preferably constant, braking torque against the rotation that is desired to be braked about the fourth axis.

In the braking device, if the first axis and the second axis intersect, then the alpha angle is defined as the acute angle (or the right angle if the first axis and the second axis are perpendicular) between the first and second axes. If the first axis and the second axis do not intersect, the alpha angle is defined as the acute or the right angle between the first and second axes when viewed along the direction of the shortest line joining the first and second axes. An alternative way of expressing this geometric relationship is to consider a point on the first axis and to consider an imaginary line which passes through this point and which is parallel to the second axis. The alpha angle is then defined as the acute or the right angle at which the first axis intersects this imaginary line. If the first and the second axes are parallel or coincident, then the alpha angle is 0 degrees. If the first and the second axes are perpendicular, then the alpha angle is 90 degrees. Therefore, the minimum value of the alpha angle is 0 degrees and the maximum value of the alpha angle is 90 degrees.

In the braking device, if the second axis and the fourth axis intersect, then the beta angle is defined as the acute angle (or the right angle if the second axis and the fourth axis are perpendicular) between the second and fourth axes. If the second axis and the fourth axis do not intersect, the beta angle is defined as the acute or the right angle between the second and fourth axes when viewed along the direction of the shortest line joining the second and fourth axes. An alternative way of expressing this geometric relationship is to consider a point on the second axis and to consider an imaginary line which passes through this point and which is parallel to the fourth axis. The beta angle is then defined as the acute or the right angle at which the second axis intersects this imaginary line. If the second and the fourth axes are parallel or coincident, then the beta angle is 0 degrees. If the second and the fourth axes are perpendicular, then the beta angle is 90 degrees. Therefore, the minimum value of the beta angle is 0 degrees and the maximum value of the beta angle is 90 degrees.

In order to obtain braking torque in the braking device, the alpha angle should be greater than 0 degrees, and the beta angle should be greater than 0 degrees and less than 90 degrees.

The braking device may comprise an inner cradle, a middle cradle and a frame.

In the braking device, the second axis is allowed to rotate about the fourth axis independently of rotation of the body about the second axis, and the body is allowed to rotate about the second axis independently of rotation of the second axis about the fourth axis. This means that if the body is initially stationary, then rotation of the second axis about the fourth axis should not cause rotation of the body about the second axis with respect to the frame of the braking device, that is with respect to a reference frame attached to the frame of the braking device, and rotation of the body about the second axis with respect to the frame of the braking device should not cause rotation of the second axis about the fourth axis. This also additionally means that if the body is initially stationary, then rotation of the second axis about the fourth axis should not cause rotation of the body about the fourth axis, and rotation of the body about the second should not cause rotation of the body about the fourth axis.

The braking device should satisfy the following two features: (i) if the body is initially stationary, then rotation of the means for connecting a rotation that is desired to be braked about the fourth axis to the body so as to transmit rotation and torque to the body about the second axis causes the body to rotate only about the second axis, that is it does neither cause the body to rotate about the fourth axis, nor cause the second axis to rotate about the fourth axis; and (ii) the second axis is allowed to rotate about the fourth axis (note that this may also be a limited rotation) even if the means for connecting a rotation that is desired to be braked about the fourth axis to the body so as to transmit rotation and torque to the body about the second axis is kept stationary.

The body may have a limited freedom of rotation about the third axis. For instance, if the body has a freedom of rotation about an axis x which makes an acute angle (which is less than 90 degrees) with the third axis (in other words, if a vector along the axis x has a component on the third axis), then the body has a limited freedom of rotation about the third axis which means that the body is allowed to rotate about the third axis.

The braking device may comprise an outer cradle wherein the body is mounted for rotation about the first axis within the inner cradle, the inner cradle is mounted for rotation about the second axis within the middle cradle, the middle cradle is mounted for rotation about a fifth axis within the outer cradle, and the outer cradle is mounted for rotation about a sixth axis within the frame.

The braking device may comprise means for preventing rotation of the middle cradle about the second axis wherein the body is mounted for rotation about the first axis within the inner cradle, the inner cradle is mounted for rotation about the second axis within the middle cradle, the middle cradle is mounted for spherical motion within the frame, and rotation of the middle cradle about the second axis is prevented.

The braking device may comprise fluid bearing means that supports the middle cradle for spherical motion within the frame.

The braking device may comprise an innermost cradle wherein the body is mounted for rotation about the first axis within the innermost cradle, the innermost cradle is mounted for rotation about a seventh axis within the inner cradle, and rotation of the innermost cradle about the seventh axis causes a change in the alpha angle.

The braking device may comprise fluid bearing means so as to support one or more of: the body, the innermost cradle, the inner cradle, the middle cradle, and the outer cradle.

The magnitude of the braking torque can be adjusted by adjusting the alpha angle. While keeping the other parameters fixed, if the alpha angle is set to 0 degrees then the magnitude of the braking torque becomes 0, that is the braking torque does not exist. The magnitude of the braking torque increases as the alpha angle increases. The magnitude of the braking torque is maximum if the alpha angle is set to 90 degrees.

The braking device may comprise means for controlling the alpha angle. The means for controlling the alpha angle may comprise means for rotating the innermost cradle about the seventh axis.

While the braking device is operating, the body may further rotate in the direction of increasing the beta angle. In order to prevent this rotation, the braking device may comprise means for controlling the beta angle. The means for controlling the beta angle may comprise means for limiting motion of the second axis such that the beta angle is constant at a selected value, and the second axis is allowed to rotate about the fourth axis. The means for limiting motion of the second axis may comprise actuator means so as to adjust the beta angle.

While keeping the other parameters fixed, if the beta angle is set to 0 degrees or 90 degrees then the magnitude of the braking torque becomes 0, that is the braking torque does not exist.

The means for connecting a rotation that is desired to be braked about the fourth axis to the body so as to transmit rotation and torque to the body about the second axis may comprise rotary connection means, the rotary connection means is mounted for rotation about the fourth axis, the rotary connection means is engaged to the rotation that is desired to be braked about the fourth axis, and the rotary connection means is so structured as to apply torque to the body about the second axis when the rotary connection means is rotated about the fourth axis.

The rotary connection means may be so structured as to apply torque to a support structure of the body about the second axis through contact when the rotary connection means is rotated about the fourth axis. In other words, the rotary connection means may be so structured as to apply torque to the body about the second axis through a support structure of the body wherein the rotary connection means is in contact with the support structure so as to apply torque to the support structure about the second axis. The support structure may be the inner cradle or the innermost cradle or any other suitable structure/cradle that supports the body.

The frictional forces that occur on the contact surfaces of the rotary connection means and the structure through which the rotary connection means applies torque to the body may prevent the body from taking the position that the body would take if there were no frictional forces. This may cause a reduction in the magnitude of the braking torque. If the magnitude of the frictional forces is high, these frictional forces may even cause the rotary connection means to apply torque to the body about the fourth axis instead of the second axis which prevents the braking torque from occurring. Therefore, the rotary connection means may comprise means for reducing the effect of frictional forces that occur on the contact surfaces of the rotary connection means and the structure through which the rotary connection means applies torque to the body. The means for reducing the effect of frictional forces may comprise one or more actuators which are mounted to the rotary connection means and arranged to apply force to the structure through which the rotary connection means applies torque to the body so as to reduce the effect of the frictional forces.

The rotary connection means may apply torque to the body about the second axis by applying force to the structure through which the rotary connection means applies torque to the body at a single point or at two different points which are located at a distance from the second axis. If there are two force application points, the rotary connection means may comprise means for distributing force between the two force application points of the rotary connection means so as to reduce the magnitude of the resultant force on the centre of mass of the body. The means for distributing force between the two force application points of the rotary connection means may comprise two cylinders, the cylinders are mounted to the rotary connection means so as to apply force to the structure through which the rotary connection means applies torque to the body, bottom chambers of the cylinders are interconnected in a closed loop, and the forces applied by the two cylinders are equal. The structure through which the rotary connection means applies torque to the body may be the inner cradle or the innermost cradle. The structure through which the rotary connection means applies torque to the body may also be a support structure of the body.

The means for connecting a rotation that is desired to be braked about the fourth axis to the body so as to transmit rotation and torque to the body about the second axis may comprise a source of motive power wherein the stator part of the source of motive power is rigidly coupled to the middle cradle and the rotor part of the source of motive power is rigidly coupled to the inner cradle, the power required for the source of motive power is provided by the rotation that is desired to be braked whereby the rotation of the stator part of the source of motive power about the second axis is prevented, and the source of motive power applies torque to the body about the second axis. Alternatively, the rotor part of the source of motive power may be rigidly coupled to the middle cradle and the stator part of the source of motive power may be rigidly coupled to the inner cradle.

The magnitude of the braking torque can be adjusted by adjusting the speed of the rotation of the body about the second axis. While keeping the other parameters fixed, if the speed of the rotation of the body about the second axis is increased then the magnitude of the braking torque also increases. If the speed of the rotation of the body about the second axis is decreased then the magnitude of the braking torque also decreases.

The braking device may comprise means for controlling the ratio of the speed of the rotation that is desired to be braked to the speed of the rotation of the body about the second axis.

The means for controlling the ratio of the speed of the rotation that is desired to be braked to the speed of the rotation of the body about the second axis may comprise transmission means such that the rotation that is desired to be braked is engaged to the input shaft of the transmission means, and the means for connecting a rotation that is desired to be braked about the fourth axis to the body so as to transmit rotation and torque to the body about the second axis is engaged to the output shaft of the transmission means.

The means for rotating the body about the first axis may comprise one or more of: an electrical motor; a hydraulic motor; and a pneumatic motor.

The body may also be rotated about the first axis by means of pressurized fluid. For this purpose, the body may comprise one or more blades. The means for rotating the body about the first axis may comprise means for pumping fluid, and means for projecting fluid onto the blades of the body so as to rotate the body about the first axis.

Alternatively or additionally, the body may comprise one or more fluid pipes or channels. The means for rotating the body about the first axis may comprise means for pumping fluid into one or more fluid pipes or channels of the body such that as the fluid exits from nozzles of the pipes or channels, the body is rotated about the first axis as a result of the reaction of the fluid.

The power required for the means for rotating the body about the first axis may be provided by the rotation that is desired to be braked. For this purpose, an electricity generator and/or a fluid pump which is engaged to the rotation that is desired to be braked may be provided. Alternatively, the means for rotating the body about the first axis may comprise mechanical engaging means for engaging the rotation of the body about the second axis to the rotation of the body about the first axis whereby when the body is rotated about the second axis, the body also rotates about the first axis. In this case, the mechanical engaging means may comprise transmission means so as to change the speed of the rotation of the body about the first axis.

The magnitude of the braking torque can be adjusted by adjusting the speed of the rotation of the body about the first axis. When the speed of the rotation of the body about the first axis is increased, the magnitude of the braking torque also increases. When the speed of the rotation of the body about the first axis is decreased, the magnitude of the braking torque also decreases.

The braking device may comprise means for controlling the means for rotating the body about the first axis so as to control the speed of the rotation of the body about the first axis.

The braking device may comprise one or more sensors for measuring values of one or more of the following parameters: the speed of the rotation of the body about the first axis; the speed of the rotation of the means for connecting a rotation that is desired to be braked about the fourth axis to the body so as to transmit rotation and torque to the body about the second axis; the alpha angle; the beta angle; the magnitude of the braking torque; the speed of the rotation that is desired to be braked.

The braking device may comprise a controller with an automatic control unit that controls one or more of: the speed of the rotation of the body about the first axis; the alpha angle; the beta angle; and the ratio of the speed of the rotation that is desired to be braked to the speed of the rotation of the body about the second axis.

The braking device may comprise means for controlling the magnitude of the braking torque. The magnitude of the braking torque may be controlled by controlling one or more of: the speed of the rotation of the body about the first axis; the alpha angle; and the ratio of the speed of the rotation that is desired to be braked to the speed of the rotation of the body about the second axis.

While the body is rotating about the first axis, if the braking torques is not needed, then the alpha angle can be set to 0 degrees in order to remove the braking torque. However, in order to reduce the magnitudes of the internal forces which occur inside the braking device the braking device may comprise means for moving the body to a position where the first axis and the fourth axis are parallel or coincident when braking torque is not needed whereby the magnitudes of the internal forces which occur inside the braking device are reduced. The means for moving the body to a position where the first axis and the fourth axis are parallel or coincident may set both the alpha and the beta angles to 0 degrees.

The alpha angle may be set to 90 degrees.

The centre of mass of the body may be on the fourth axis. The first axis, the second axis, the third axis and the fourth axis may intersect at the centre of mass of the body. Each of the first axis, the second axis and the third axis may be perpendicular to the other two axes.

The body may be made from a material with a modulus of elasticity exceeding 70 GPa, for example rigid alloy or steel. The body may be cylindrically symmetric. The moment of inertia of the body about the first axis per unit mass may be higher than or equal to $(2/5)*R^2$ where R is radius of the minimal bounding sphere of the body, that is, the smallest sphere containing the body. The body may comprise a hub, a web and a ring shaped rim.

With such a braking device, it is possible that undesirable vibrations could arise from unbalanced internal forces within the braking device. This problem can be solved by mounting the braking device to a platform or chassis of a vehicle using suitable motor mounts. Alternatively, or in addition, the braking device may comprise one or more counterbalance masses mounted for rotation about the fourth axis. A further option, which could be used either on its own or in conjunction with one or both of the above solutions, would be to provide a plurality of such braking devices which are mounted together so as to balance the internal forces.

Thus, the present invention may extend to an assembly of two or more braking devices of the above type, in combination with means for distributing the rotation that is desired to be braked to each braking device so as to rotate each of the means for connecting a rotation that is desired to be braked about the fourth axis to the body so as to transmit rotation and torque to the body about the second axis at the same rotational speed but at different respective phase angles wherein the magnitudes of the unbalanced forces in the assembly are reduced whereby the vibrations occurred in the assembly are reduced and the magnitude of the braking torque provided by the assembly is the sum of the braking torques provided by each of the braking devices in the assembly.

The braking device can be used for braking any rotation without directly converting kinetic energy into thermal energy. The braking device does not dissipate heat during braking process other than the heat dissipated as a result of the frictional forces.

In accordance with a second aspect of the present invention there is provided a method of generating braking torque in a braking device comprising a first axis, a second axis, and a third axis, the method comprising: mounting a body for rotation about the first axis, the second axis and the third axis; rotating the body about the first axis; the braking device further comprising a fourth axis, the first axis being oriented with respect to the second axis at an alpha angle which is greater than 0 degrees, the second axis being oriented with respect to the fourth axis at a beta angle which is greater than 0 degrees and less than 90 degrees, the third axis being the precession axis about which the precession of the body occurs as a result of rotating the body about the first axis and applying torque to the body about the second axis, wherein the second axis is allowed to rotate about the fourth axis independently of rotation of the body about the second axis, and the body is allowed to rotate about the second axis independently of rotation of the second axis about the fourth axis; connecting a rotation that is desired to be braked to the fourth axis so as to transmit rotation and torque to the body about the second axis; whereby the rotation of the body about the first axis and the torque applied to the body about the second axis together cause the body to further rotate about the third axis, the body rotates about the first axis, the second axis and the third axis simultaneously, is however, the rotation of the body about the second axis and the rotation of the body about the third axis are observed as if the body rotates about the fourth axis, the rotation of the body about the first axis and the rotation of the body about the third axis together cause a braking torque to occur about the second axis; thereby to obtain braking torque against the rotation that is desired to be braked about the fourth axis.

The method may comprise adjusting the magnitude of the braking torque.

The step of adjusting the magnitude of the braking torque may comprise adjusting one or more of: the speed of the rotation of the body about the first axis; the alpha angle; and the ratio of the speed of the rotation that is desired to be braked to the speed of the rotation of the body about the second axis.

The method may comprise removing the braking torque when the braking torque is not needed. The step of removing the braking torque may comprise moving the body to a position where the first axis and the fourth axis are parallel or coincident. The step of removing the braking torque may comprise disconnecting the rotation that is desired to be braked from the body. The step of removing the braking torque may comprise adjusting the alpha angle and/or the beta angle to 0 degrees. The step of removing the braking torque may comprise stopping the rotation of the body about the first axis.

In the method, a continuous, preferably constant, braking torque may be provided against the rotation that is desired to be braked about the fourth axis.

The main claims are structured in a preamble and a characterising part. This structure is for a better understanding of the subject-matter of the claims. The distribution of the features into the preamble and the characterising part does not mean that all features of the preamble are known and all the features of the characterising part are novel, or vice versa. The value of the features of the claims is independent of whether they are in preamble or in the characterising part.

The purpose of reference signs in the claims is to make the claims easier for all to understand. They do not limit the scope of the claims but they do affect their clarity and may enable them to be expressed more concisely than would otherwise be possible.

These as well as further features, aspects, and advantages of the invention will be better appreciated by reading the following detailed description of presently preferred exemplary embodiments taken in conjunction with accompanying drawings of which:

The present invention is not limited to the presently preferred exemplary embodiments described below, and appropriate modifications can be made without changing the gist of the invention.

Figure 1:
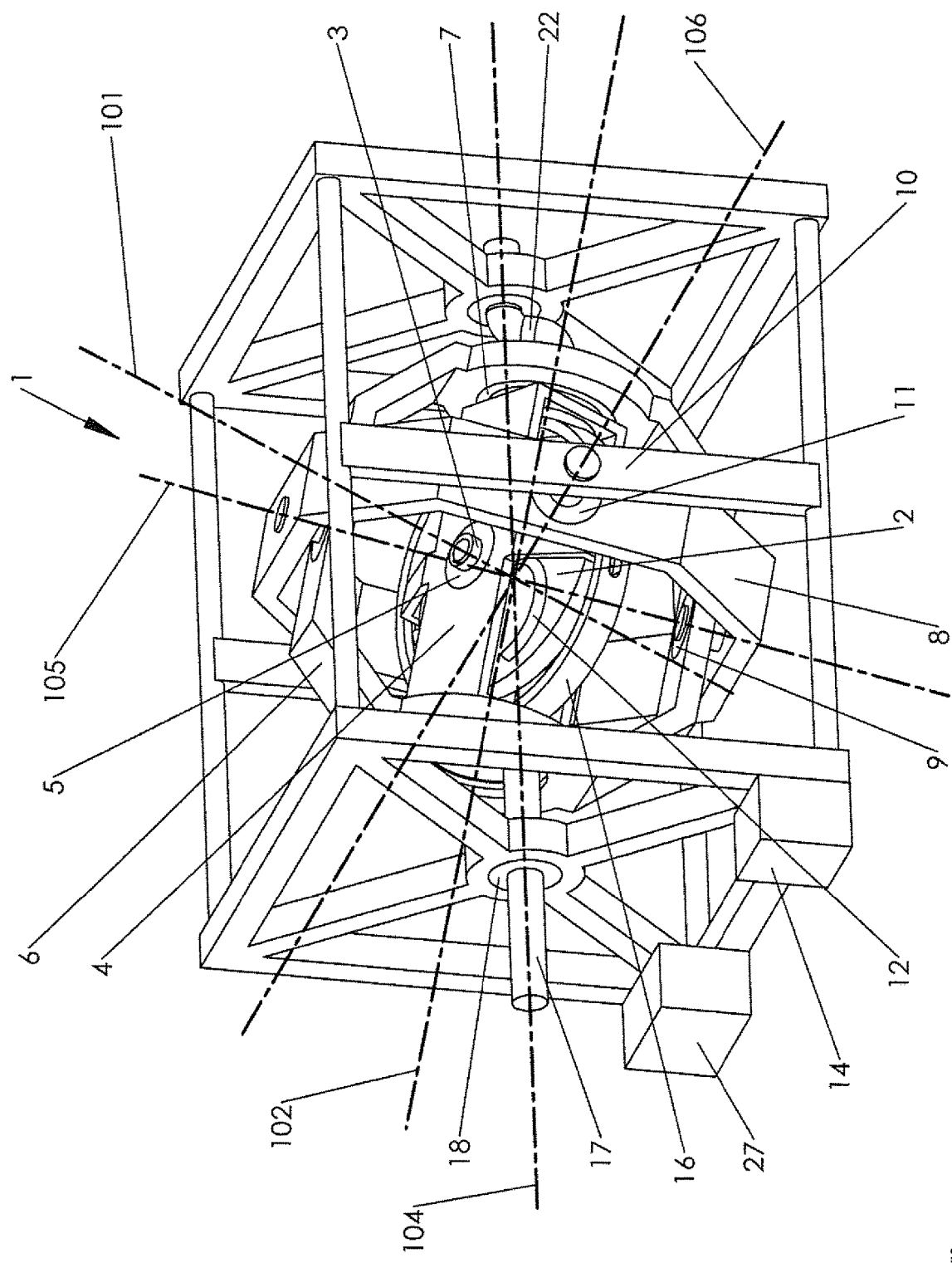
FIG. 1 is a schematic view of the braking device according to a first embodiment of the invention.
Figure 2:
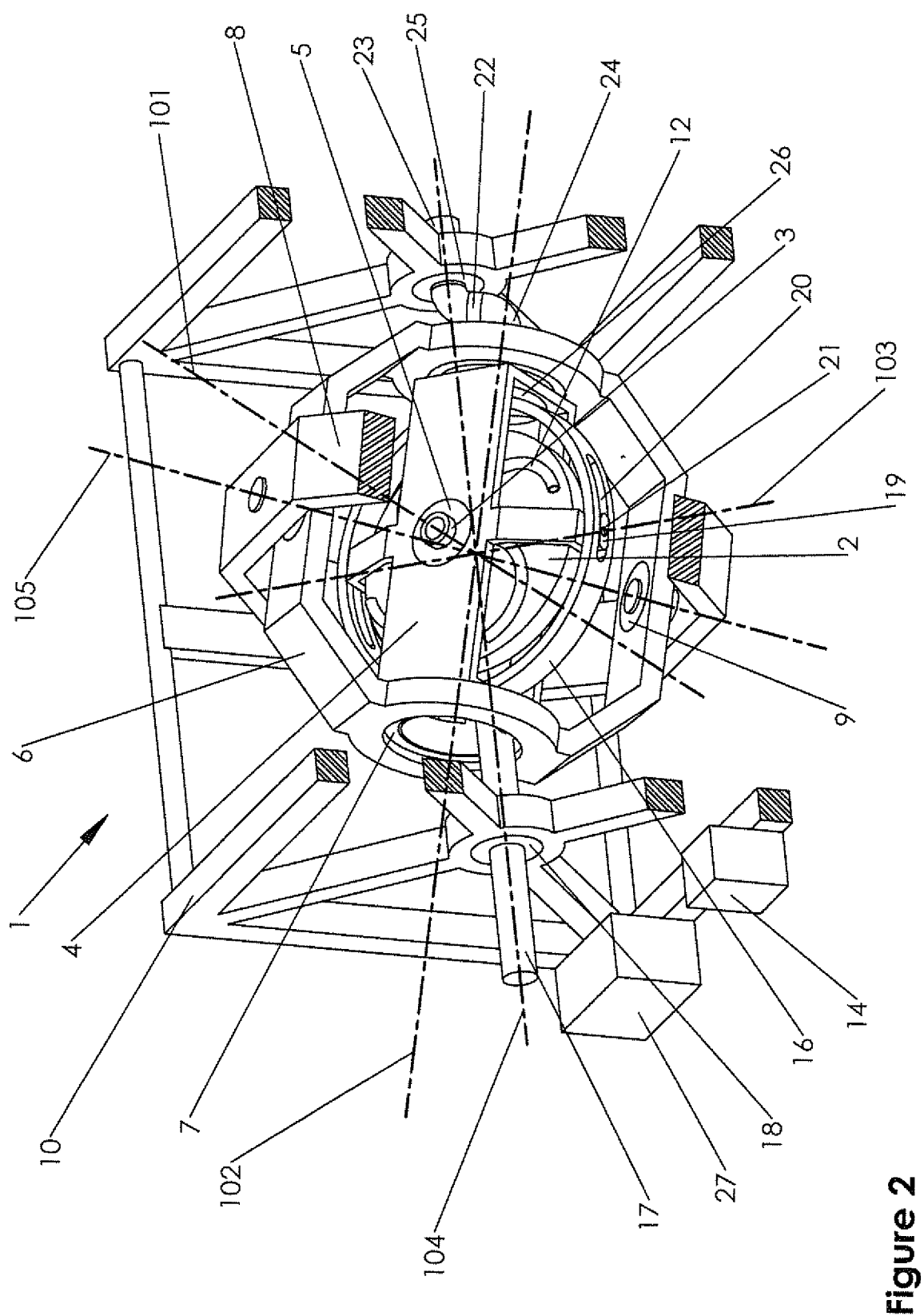
FIG. 2 is a partial cross-sectional schematic view of the braking device according to the first embodiment of the invention.
Figure 3:
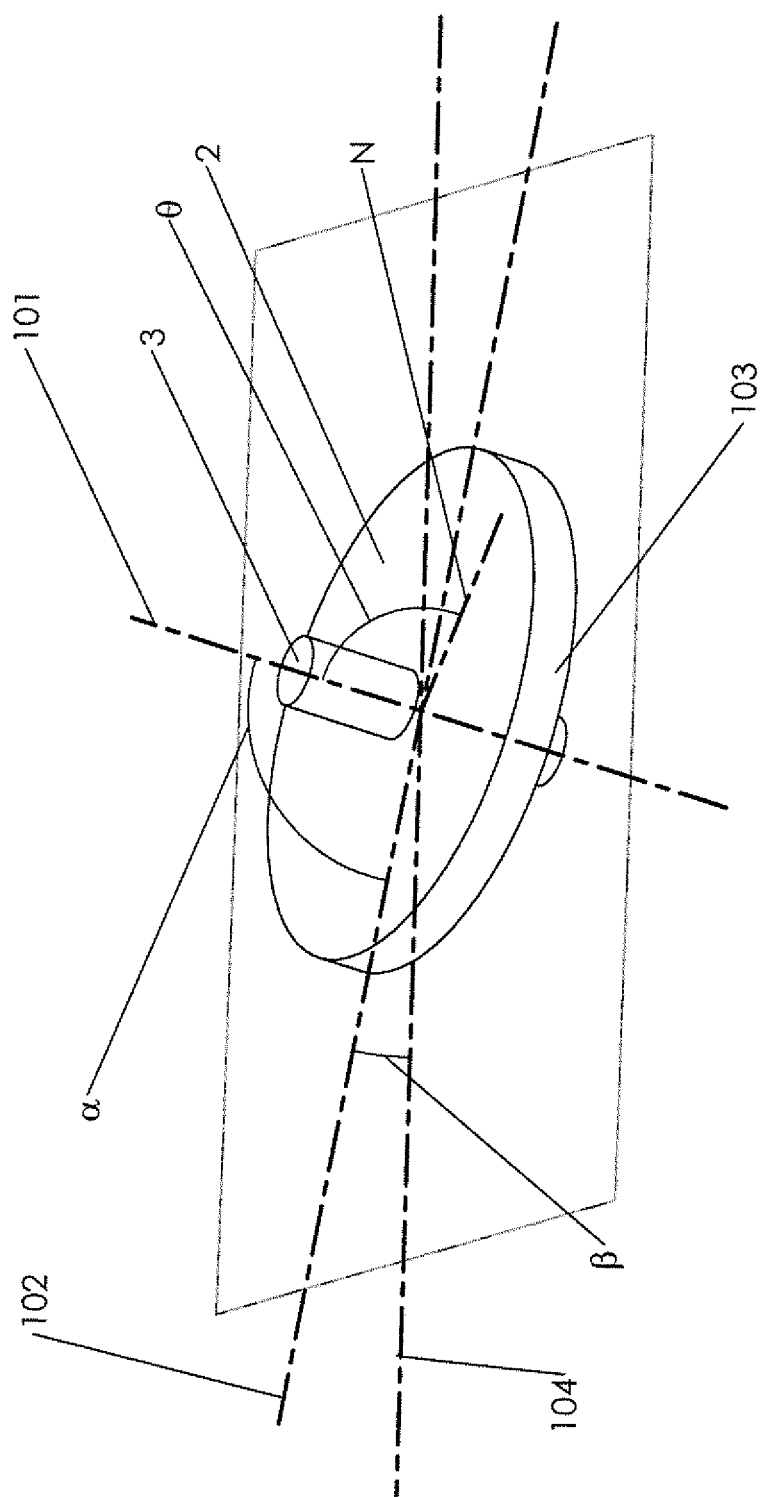
FIG. 3 is a diagram illustrating an example orientation of the first, second, third and fourth axes, the normal line of the plane which contains the second axis and the fourth axis, the alpha, beta and theta angles.

Referring to FIG. 1 and FIG. 2, a braking device 1 according to a first preferred embodiment of the invention comprises a body 2 in the form of a solid cylindrical wheel which is mounted coaxially on a rotation shaft 3 for rotation therewith about a first axis 101. The rotation shaft 3 is mounted within an inner cradle 4 by means of inner bearings 5. The inner cradle 4 is mounted for rotation about a second axis 102 within a middle cradle 6 by means of middle bearings 7. The middle cradle 6 is mounted for rotation about a fifth axis 105 within the outer cradle 8 by means of outer bearings 9, and the outer cradle 8, in turn, is mounted for rotation about a sixth axis 106 within a frame 10 by means of frame bearings 11. The type of the bearings in the braking device 1 may be fluid bearing type. The fluid may comprise liquid and/or gaseous fluids.

The braking device 1 is used to brake a rotation that is desired to be braked about a fourth axis 104. The fourth axis 104 may be in any desired orientation. The second axis 102 is oriented with respect to the fourth axis 104 at a beta angle β. The first axis 101 is oriented with respect to the second axis 102 at an alpha angle α. The sixth axis 106 is substantially perpendicular to the fourth axis 104, and the fifth axis 105 is substantially perpendicular to the sixth axis 106. In order to obtain braking torque, the alpha angle α should be set to a value which is greater than 0 degrees and the beta angle β should be set to a value which is greater than 0 degrees and less than 90 degrees. The third axis 103 is defined as the precession axis about which the precession of the body 2 occurs as a result of rotating the body 2 about the first axis 101 and applying torque to the body 2 about the second axis 102. In other words, while the body 2 is being rotated about the first axis 101, if a torque is applied to the body 2 about the second axis 102, the body 2 starts precessing about the third axis 103, that is the first axis 101 starts rotating about the third axis 103. The third axis 103 is perpendicular to both the first axis 101 and the second axis 102. The first axis 101, the second axis 102, the third axis 103 and the fourth axis 104 substantially intersect at the centre of mass of the body 2. An example orientation of the axes can be seen in FIG. 4.

Since the braking torque does not exist when the beta angle β is 0 degrees or 90 degrees, the beta angle β values which are close to 0 degrees or 90 degrees may cause a reduction in the magnitude of the braking torque, therefore these values may not be preferred.

The strength of the body 2 and the density distribution of the body 2 may affect the magnitude of the braking torque. The form of the body 2 may be different than solid cylindrical wheel. The body 2 may comprise a hub, a web and a rim of ring shape. The form of the body 2 may be such that the moment of inertia of the body 2 about the first axis 101 per unit mass is higher than or equal to $(2/5)*R^2$ where R is radius of the minimal bounding sphere of the body 2. The minimal bounding sphere is defined as the smallest sphere which contains the body 2. The body 2 may also be made from a material with a modulus of elasticity exceeding 70 GPa. The first axis 101 may be oriented with respect to the body 2 such that the moment of inertia of the body 2 about the first axis 101 is substantially maximised.

Figure 4:
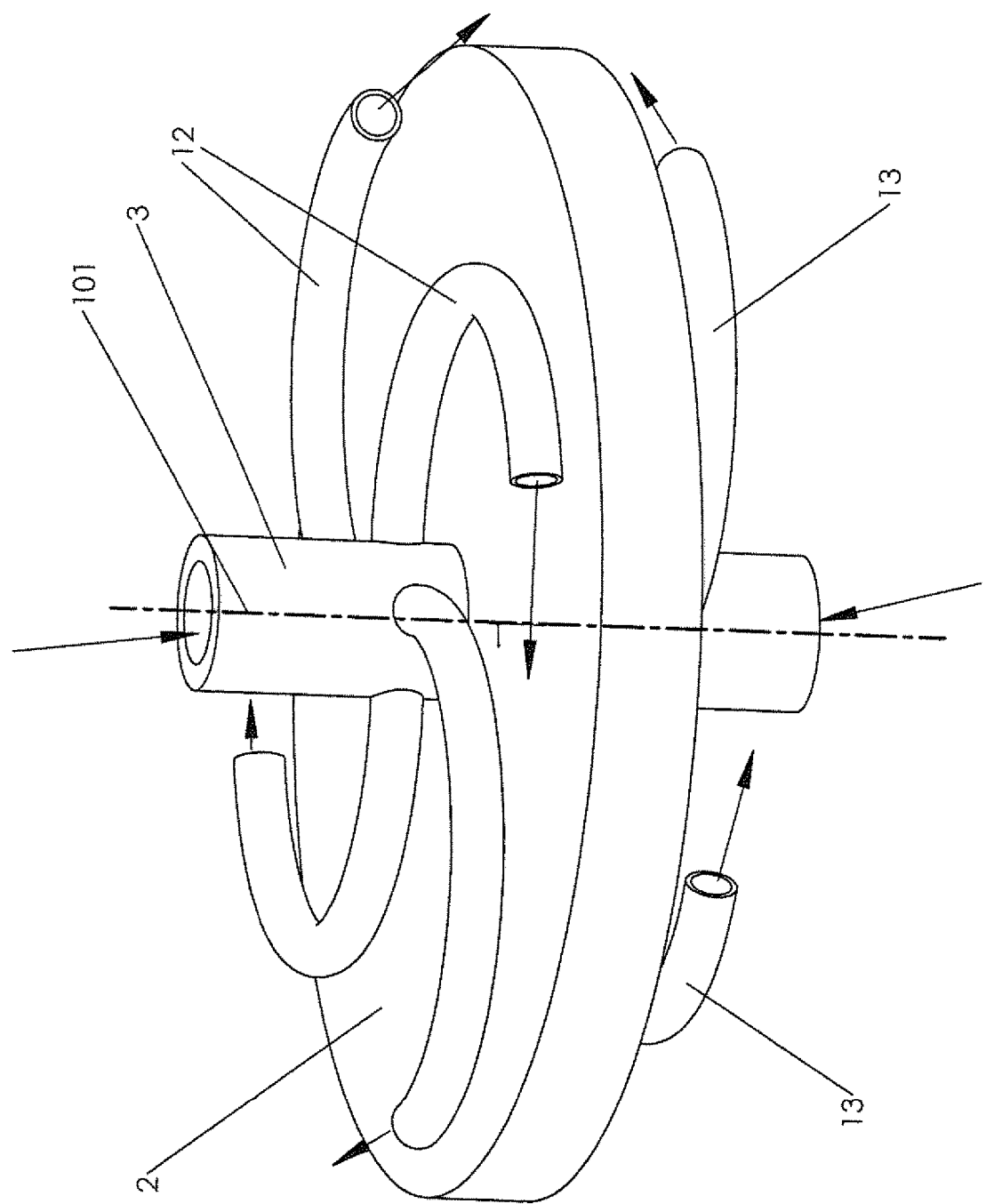
FIG. 4 illustrates an example placement of pipes on the rotation shaft of the body according to an embodiment of means for rotating the body about the first axis.

The body 2 is rotated about the first axis 101 by means of pressurized fluid. For this purpose, the body 2 comprises one or more fluid pipes 12 mounted on the rotation shaft 3 directed radially outward from the centre of the rotation shaft 3. In addition to this, the braking device 1 comprises a fluid pump 14, and means (not shown) for conveying pressurized fluid to the pipes 12 mounted on the rotation shaft 3. There is a fluid channel located inside the rotation shaft 3. The fluid entering this channel is indicated by the axially arranged arrows as can be seen in FIG. 4. The means (not shown) for conveying pressurized fluid to the pipes 12 may comprise one or more of: pipes; tubes, hoses, channels and rotary joints. The power required for the fluid pump 14 may be provided by an external power supply or by the rotation that is desired to be braked. The nozzles of the pipes 12 are oriented such that as the pressurized fluid exits from the nozzles, the reaction of the fluid applies torque to the body 2 so as to rotate the body 2 about the first axis 101. For increasing the magnitude of the torque applied to the body 2 about the first axis 101, it is preferred that the nozzles are oriented in tangential direction to the body 2. The magnitude of the torque applied to the body 2 about the first axis 101 can be controlled by controlling the flow rate of the fluid.

The body 2 may comprise another set of fluid pipes 13, the nozzles of which are oriented so as to apply torque to the body 2 about the first axis 101 in the opposite direction. In this case, conveying fluid to this set of pipes 13 causes deceleration of the body 2 about the first axis 101, A valve may be provided in order to alternate the fluid between the first set of pipes 12 and the second set of pipes 13. An example placement of the first set of pipes 12 and the second set of pipes 13 can be seen in FIG. 4. The arrows in FIG. 4 indicate the flow direction of the fluid for this particular example. Instead of the pipes, similarly formed channels may be provided inside the body 2.

Figure 5:
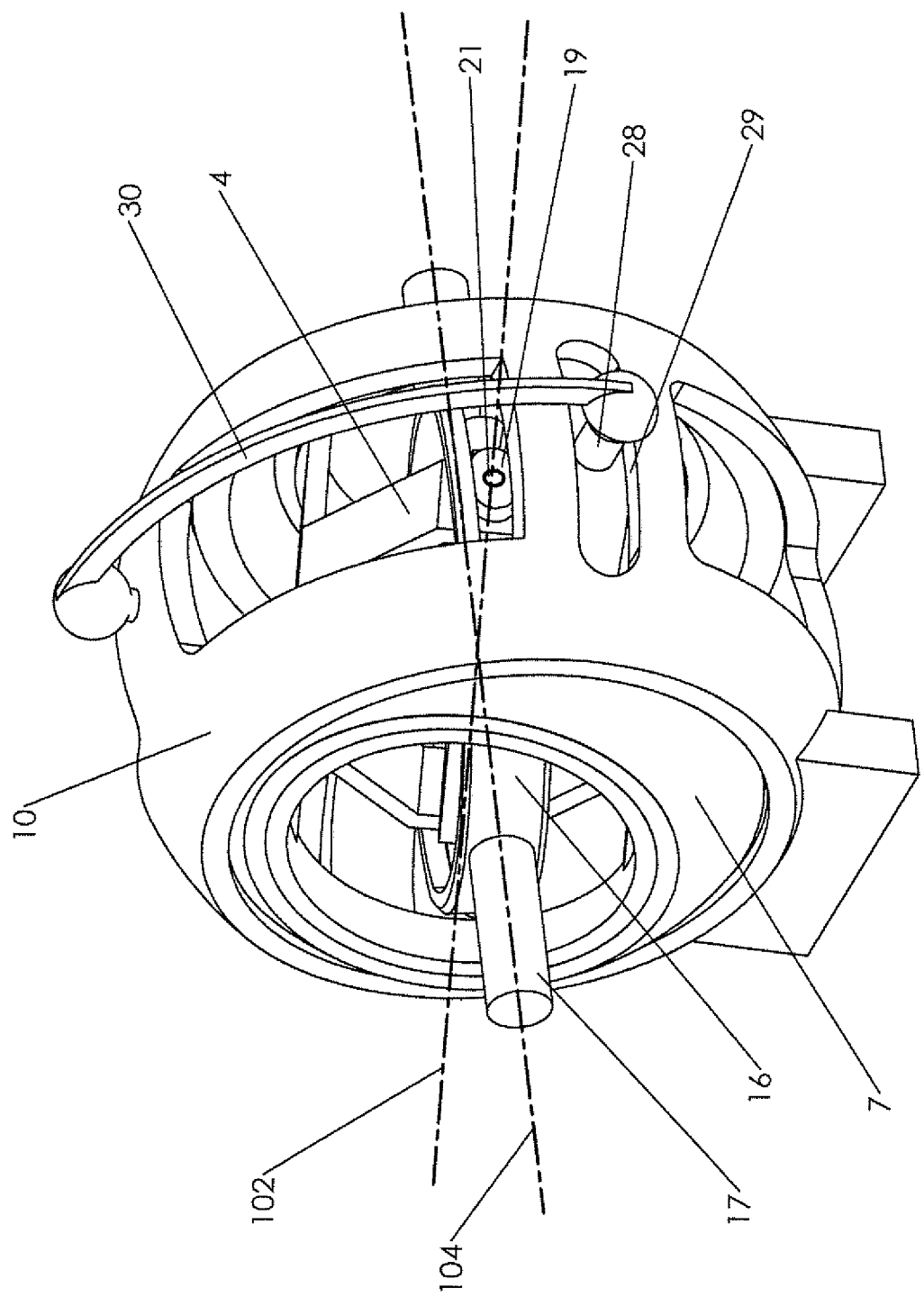
FIG. 5 shows an embodiment of means for preventing rotation of the middle cradle about the second axis according to a second embodiment of the invention.

Referring to FIG. 1, FIG. 2 and FIG. 5 for example, the braking device 1 comprises rotary connection means 16 which is used for connecting the rotation that is desired to be braked about the fourth axis 104 to the body 2 so as to transmit rotation and torque to the body 2 about the second axis 102. The rotary connection means 16 is rigidly coupled to a shaft 17 which is mounted for rotation about the fourth axis 104 by means of rotary connection means bearings 18. The shaft 17 of the rotary connection means 16 along the fourth axis 104 is engaged to the rotation that is desired to be braked about the fourth axis 104. The rotary connection means 16 is in the form of a ring. On the rotary connection means 16, there are two symmetrical slots 20 with respect to the fourth axis 104. The inner cradle 4 comprises two pins 21 in the form of a solid sphere which are oriented along the third axis 103. Each of these two pins 21 is supported by a sliding part 19 for spherical motion. Each sliding part 19 is arranged to slide inside one of the slots 20 on the rotary connection means 16. This arrangement allows the rotation of the inner cradle 4 about the third axis 103 with respect to the rotary connection means 16. The orientations of the slots 20 are determined such that the inner cradle 4 is allowed to rotate in a limited manner about an eighth axis 108 with respect to the rotary connection means 16. The eighth axis 108 is defined as the axis which is perpendicular to both the third axis 103 and the fourth axis 104 and passes through the centre of mass of the body 2. The size and the locations of the slots 20 are also determined such that a full rotation of the second axis 102 about the fourth axis 104 is allowed while the rotary connection means 16 is kept stationary. It is preferred that the magnitudes of the frictional forces between the sliding parts 19 and the corresponding slots 20, and between the pins 21 and the corresponding sliding parts 19 are as small as possible. With this arrangement, if the body 2 is initially stationary, a rotation of the rotary connection means 16 causes the body 2 to rotate about the second axis 102.

Because of the production tolerances, there may be a difference in the magnitudes of the forces applied by the rotary connection means 16 to the inner cradle 4 through these two pins 21. In order to reduce this difference, the pins 21 may be mounted to the inner cradle 4 elastically so as to allow small movement of the pins 21 with respect to the inner cradle 4. This provides more balanced distribution of forces applied through these two pins 21, hence reducing the resultant force on the centre of the body 2.

The braking device 1 may also comprise a clutch for disengaging the rotation that is desired to be braked from the rotary connection means 16 when braking torque is not needed. Additionally, a transmission may be provided in order to change the ratio of the speed of the rotation that is desired to be braked to the speed of the rotation of the rotary connection means 16 about the fourth axis 104. In this case, the input shaft of the transmission is engaged to the rotation that is desired to be braked and the output shaft is engaged to the shaft 17 of the rotary connection means 16. Since the rotary connection means 16 connects the rotation that is desired to be braked about the fourth axis 104 to the body 2 so as to transmit rotation and torque to the body 2 about the second axis 102, the transmission also allows to change the speed of the rotation of the body 2 about the second axis 102 while the speed of the rotation that is desired to be braked is constant.

Figure 12:
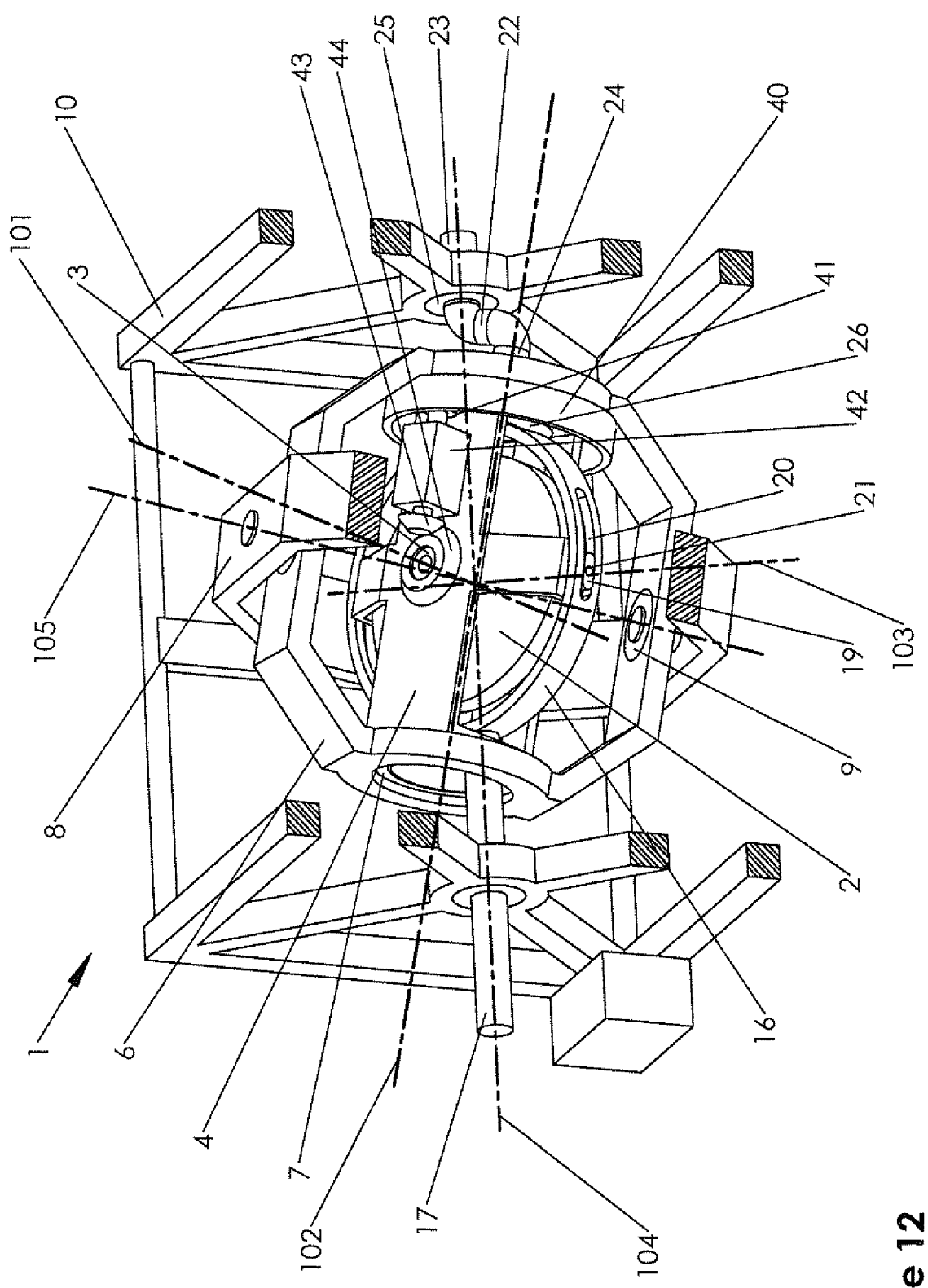
FIG. 12 shows an embodiment of means for rotating the body about the first axis.

Referring to FIG. 1, FIG. 2 and FIG. 12 for example, the braking device 1 also comprises means for controlling the beta angle β. The means for controlling the beta angle β comprises an arm 22 which will be referred as the limiting arm 22. The limiting arm 22 comprises two rods which are rigidly coupled together such that the angle between the axis along which the first rod 23 is oriented and the axis along which the second rod 24 is oriented is at a desired value for the beta angle β. The limiting arm 22 is mounted to the braking device 1 such that the first rod 23 lies along the fourth axis 104 and supported for rotation about the fourth axis 104 by means of the first limiting arm bearings 25 of the frame 10; and the second rod 24 lies along the second axis 102 and supported for rotation about the second axis 102 by means of the second limiting arm bearings 26 of the inner cradle 4. This arrangement ensures that the motion of the second axis 102 is limited so as to keep the beta angle β constant at a selected value while allowing the second axis 102 to rotate about the fourth axis 104.

The means for controlling the beta angle β may further comprise an actuator in order to adjust the beta angle β. In this case, the limiting arm 22 may comprise a hydraulic cylinder such that the barrel of the cylinder is jointly coupled to the first rod 23 and the piston rod of the cylinder is jointly coupled to the second rod 24. This arrangement allows controlling of the beta angle β by adjusting the length of the stroke of the piston rod.

The braking device 1 preferably comprises sensors for measuring values of: the speed of the rotation of the body 2 about the first axis 101; the speed of the rotation of the rotary connection means 16; the beta angle β; the speed of the rotation that is desired to be braked.

The braking device 1 comprises an automatic control unit 27 (as can be seen in FIG. 1 and FIG. 2 for example) which is used to provide different operating conditions. Depending on the application area, the automatic control unit 27 gets different input signals from various sensors of the braking device 1 and sets the parameters of the device such as the speed of the rotation of the body 2 about the first axis 101, the magnitude of the braking torque, the beta angle β, and the ratio of the speed of the rotation that is desired to be braked to the speed of the rotation of the body 2 about the second axis 102. The automatic control unit 27 may also control the magnitude of the braking torque so as to keep the speed of the rotation that is desired to be braked substantially constant at a desired value (for instance, in order to keep the speed of a vehicle traveling downhill substantially constant at a desired value).

In order to control the magnitude of the braking torque, the automatic control unit 27 controls the speed of the rotation of the body 2 about the first axis 101 and/or the speed of the rotation of the body 2 about the second axis 102. The speed of the rotation of the body 2 about the second axis 102 may be controlled by changing the ratio of the speed of the rotation that is desired to be braked to the speed of the rotation of the rotary connection means 16 about the fourth axis 104, that is by changing the speed ratio of the transmission.

The automatic control unit 27 may also control the braking device 1 so as to remove the braking torque on the rotation that is desired to be braked when braking torque is not needed. The braking torque may be removed using at least one of: (i) stopping the rotation of the body 2 about the first axis 101, (ii) setting the beta angle β to 0 degrees or 90 degrees, (iii) disengaging the rotation that is desired to be braked from the rotary connection means 16. However, the braking torque may not be totally removed by setting the beta angle β to 0 degrees or 90 degrees because of the possible vibrations and deformations occurred in the braking device 1 which are caused by the internal forces.

Before describing the operation of the braking device 1, a further angle definition will be introduced. The normal line of the plane which contains the second axis 102 and the fourth axis 104 is defined as the line which is orthogonal to this plane and passes through the centre of mass of the body 2. The theta angle θ is defined as the acute angle (or possibly the right angle) between the first axis 101 and the normal line of the plane which contains the second axis 102 and the fourth axis 104.

In the operation of the braking device 1, the body 2 is first caused to rotate about the first axis 101 by means of conveying pressurized fluid obtained from the fluid pump 14 to the pipes 12 on the rotational shaft of the body 2. When the rotation that is desired to be braked is engaged to the rotary connection means 16, the rotary connection means 16 connects the rotation that is desired to be braked to the body 2 so as to transmit rotation and torque to the body 2 about the second axis 102. Thus, through the rotary connection means 16, a torque is applied to the body 2 about the second axis 102 so as to rotate the body 2 about the second axis 102. At first, the torque applied to the body 2 about the second axis 102 causes the body 2 to rotate about the second axis 102 such that the theta angle 9 becomes smaller than 90 degrees if it is not already so. In other words, the first axis 101 no more lies in the plane which contains the second axis 102 and the fourth axis 104. This enables the body 2 to have a limited freedom of rotation about the third axis 103 so that the body 2 is able to rotate about the third axis 103. As a result of (i) the rotation of the body 2 about the first axis 101, and (ii) the torque applied to the body 2 about the second axis 102, the body 2 starts rotating about the third axis 103. In is the literature, this rotation is known as precession. Thus, the body 2 rotates about the first axis 101, the second axis 102 and the third axis 103 simultaneously. However, the rotation of the body 2 about the second axis 102 and the rotation of the body 2 about the third axis 103 are observed as if the body 2 rotates about the fourth axis 104. In other words, the body 2 is not rotated about the fourth axis 104; and the observed rotation of the body 2 about the fourth axis 104 is actually a result of the rotation of the body 2 about both the second axis 102 and the third axis 103. The rotation of the body 2 about the first axis 101 and the rotation of the body 2 about the third axis 103 together cause a braking torque to occur about the second axis 102. The braking torque about the second axis 102 is transmitted back to the rotation that is desired to be braked about the fourth axis 104 by means of the rotary connection means 16. During the operation of the braking device 1, the theta angle θ remains constant at a value less than 90 degrees as long as the parameters of the braking device 1 are kept constant. The value of the theta angle 9 depends on the parameters of the braking device 1. Therefore, the braking device 1 provides continuous braking torque against the rotation that is desired to be braked about the fourth axis 104.

Referring to FIG. 5, in a second preferred embodiment, the outer cradle 8 is not used and the middle cradle 6 is mounted for spherical motion within the frame 10 by means of fluid bearings. However, in order for the rotary connection means 16 to function properly, the rotation of the middle cradle 6 about the second axis 102 should be prevented while allowing the rotation of the second axis 102 about the fourth axis 104. This could be achieved, for instance, by providing a guidance mechanism comprising a guidance pin 28 attached to the middle cradle 6, and a guidance arm 30 one end of which is jointly mounted to the frame 10 and the other end of which is jointly mounted to the guidance pin 28 of the middle cradle 6. In order to mount the guidance arm 30 to the guidance pin 28, a linear guidance slot 29 is provided on the frame 10. The guidance pin 28 is located inside this guidance slot 29, The guidance arm 30 preferably comprises some elastic material so as to dampen possible vibrations. The form and the location of the guidance pin 28, the guidance arm 30 and the guidance slot 29 can be different than the ones shown in FIG. 5 as long as the rotation of the middle cradle 6 about the second axis 102 is prevented while allowing the rotation of the second axis 102 about the fourth axis 104. Note that FIG. 5 is provided for illustrating the parts which are specific for this embodiment.

Instead of using the guidance arm 30, the motion of the guidance pin 28 may also be constrained by means of the guidance slot 29 only. In this case, the guidance pin 28 may be supported for rotation by a sliding part for spherical motion. The sliding part may be arranged to slide inside the guidance slot 29. It is preferred that the magnitudes of the frictional forces between the sliding part and the slot 29, and between the guidance pin 28 and the sliding part are as small as possible.

Note that if the frictional forces against the rotation of the middle cradle 6 about the second axis 102 is guaranteed to be higher than the frictional forces against the rotation of the second axis 102 about the fourth axis 104, the above mentioned guidance mechanism may not be needed. In this case the rotation of the middle cradle 6 about the second axis 102 is prevented by means of frictional forces. However, this may not be reliable, thus it may be preferred to use the above mentioned guidance mechanism.

Figure 6:
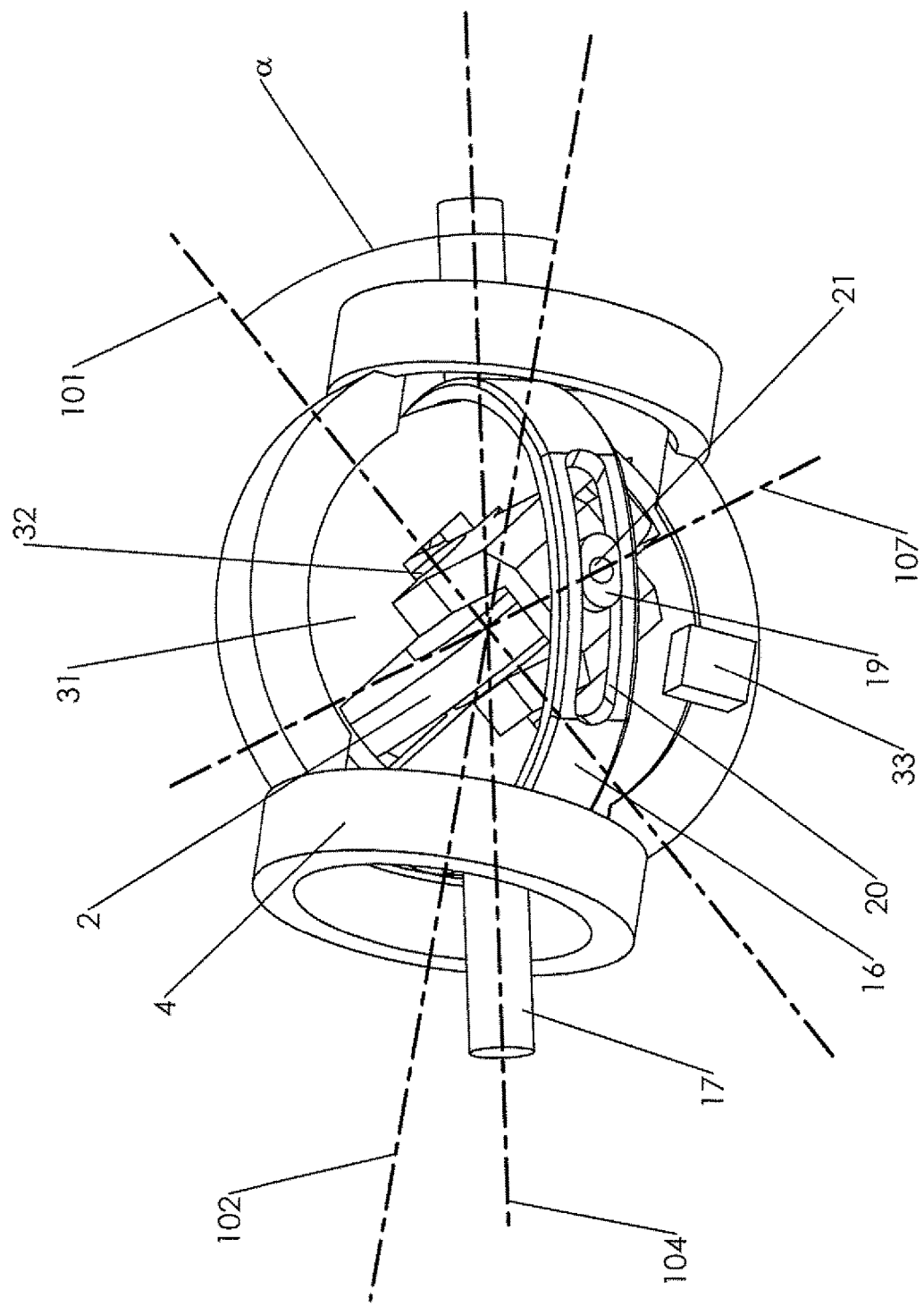
FIG. 6 shows an embodiment of innermost cradle and an embodiment of means for rotating the innermost cradle according to a third embodiment of the invention.

In a third preferred embodiment, an innermost cradle 31 is provided as illustrated in FIG. 6. Instead of mounting the rotation shaft 3 of body 2 within the inner cradle 4 by means of inner bearings 5 as in the previous embodiments, in this embodiment, the rotation shaft 3 of the body 2 is mounted for rotation about the first axis 101 within the innermost cradle 31 by means of innermost bearings 32. The innermost cradle 31, in turn, is mounted for rotation about a seventh axis 107 within the inner cradle 4 by means of, for instance, a track roller guidance system or a fluid bearing. The seventh axis 107 is an axis such that the rotation of the innermost cradle 31 about the seventh axis 107 causes a change in the alpha angle α. However, the seventh axis 107 is preferably same as the third axis 103. The braking device 1 also comprises an actuator 33 for rotating the innermost cradle 31 about the seventh axis 107 within the inner cradle 4. The actuator 33 could be for instance a motor or a hydraulic cylinder or a pneumatic cylinder. The alpha angle α can be adjusted by controlling the actuator 33. Therefore, in this embodiment, the magnitude of the braking torque can be adjusted by adjusting the alpha angle α. Furthermore, in conjunction with the means for controlling the beta angle β, it is possible to move the body 2 to a position where the first axis 101 and the fourth axis 104 are parallel or coincident when braking torque is not needed. In order to achieve this, the automatic control unit 27 may set both the alpha angle α and the beta angle β to 0 degrees which causes a reduction in the magnitudes of the internal forces which occur inside the braking device 1 when braking torque is not needed. Note that FIG. 6 is provided for illustrating the parts which are specific for this embodiment.

Figure 7:
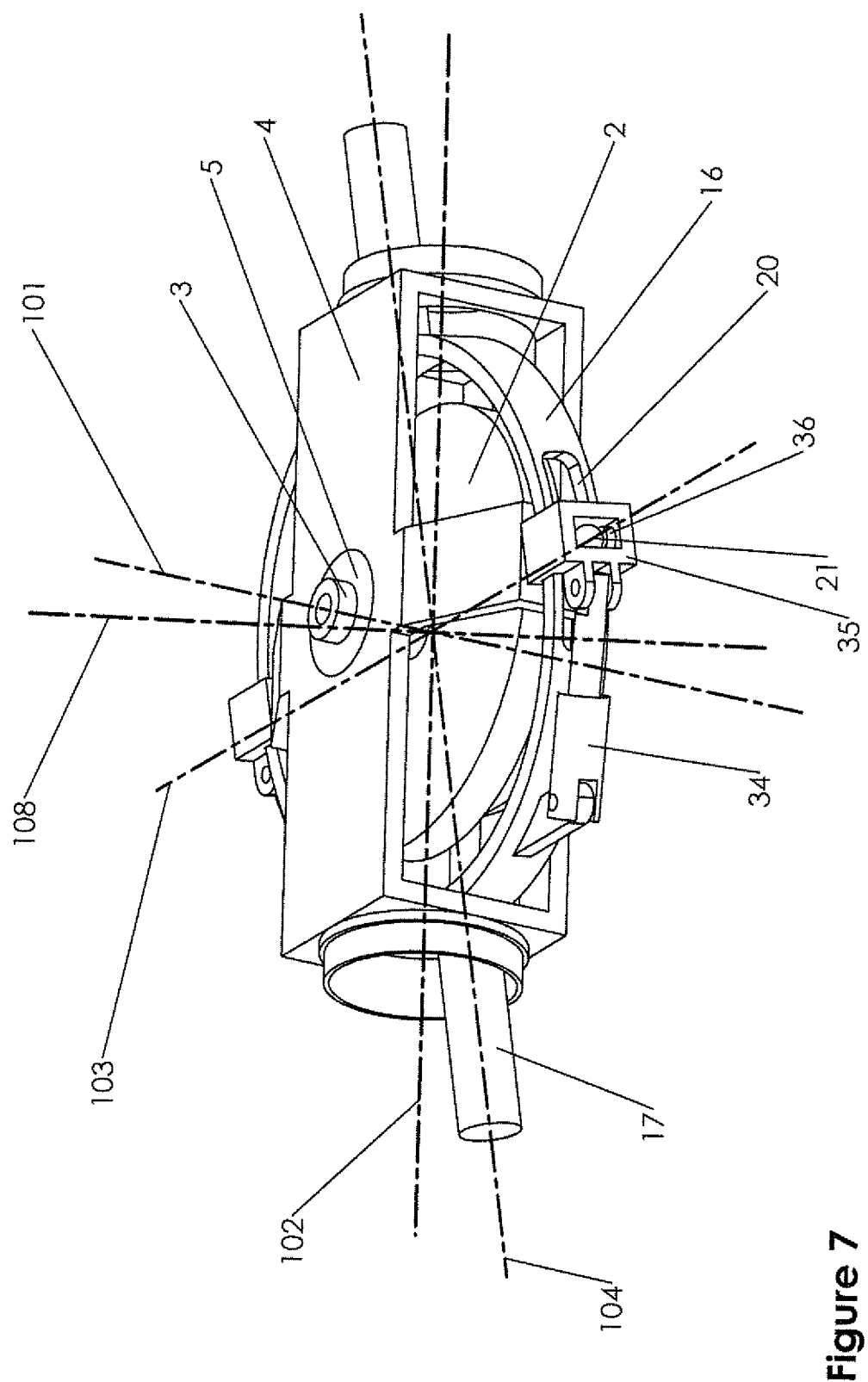
FIG. 7 shows an embodiment of means for reducing the effect of frictional forces and an embodiment of means for distributing force between the two force application points of the rotary connection means.

Referring to FIG. 7, a preferred embodiment of the means for reducing the effect of frictional forces that occur on the contact surfaces of the rotary connection means 16 and the structure through which the rotary connection means 16 applies torque to the body 2 comprises two identical structures which are mounted symmetrically with respect to the fourth axis 104. Each structure comprises a cylinder 34 and a housing 35 wherein the barrel of the cylinder 34 is jointly mounted to the rotary connection means 16 and the piston rod of the cylinder 34 is jointly mounted to the housing 35. The cylinders 34 can be hydraulic or pneumatic. Instead of cylinders 34, another kind of actuators may also be used. Each of the housings 35 is structured to slide inside one of the slots 20 of the rotary connection means 16 and also supports one of the spherical pins 21 of the inner cradle 4 for spherical motion. In this arrangement, extending one of the cylinders 34 and retracting the other cylinder 34 causes the inner cradle 4 to rotate about the eighth axis 108. Rotation of the inner cradle 4 about the eighth axis 108 causes a change in the theta angle θ. Thus, by controlling the stroke length of the cylinders 34, the theta angle can be adjusted.

During the operation of the braking device 1, the theta angle θ remains constant at a value which is less than 90 degrees as long as the parameters of the braking device 1 are kept constant. The frictional forces between the sliding parts 19 connected to the pins 21 of the inner cradle 4 (or specifically the housings 35 in this particular embodiment) and the corresponding slots 20 of the rotary connection means 16 may prevent the body 2 from taking a position with a smaller theta angle θ value. This may is cause a reduction in the magnitude of the braking torque. In order to prevent or reduce this effect of the frictional forces, the inner cradle 4 may be rotated about the eighth axis 108 so as to bring the body 2 to a position with a desired theta angle θ value which is smaller than the previous value. It should be noted that the rotation of the inner cradle 4 about the eighth axis 108 in the direction so as to decrease the theta angle θ should not be prevented. However, the cylinders 34 may be controlled so as to prevent the rotation of the inner cradle 4 about the eighth axis 108 in the direction so as to increase the theta angle θ at the desired theta angle θ value.

Alternatively, instead of using cylinders 34, the size and the locations of the slots 20 of the rotary connection means 16 can be determined such that the rotation of the inner cradle 4 about the eighth axis 108 in the direction so as to increase the theta angle θ is prevented at the desired theta angle θ value. This may also be achieved by means of a mechanical abutment placed on the rotary connection means 16 restricting the motion of the at least one of the sliding parts 19 connected to the pins 21 of the inner cradle 4 inside the corresponding slots 20 of the rotary connection means 16. It is found that the smaller theta angle θ values may provide an increase in the magnitude of the braking torque and also a reduction in the amount of vibrations occurred in the braking device 1.

Figure 8:
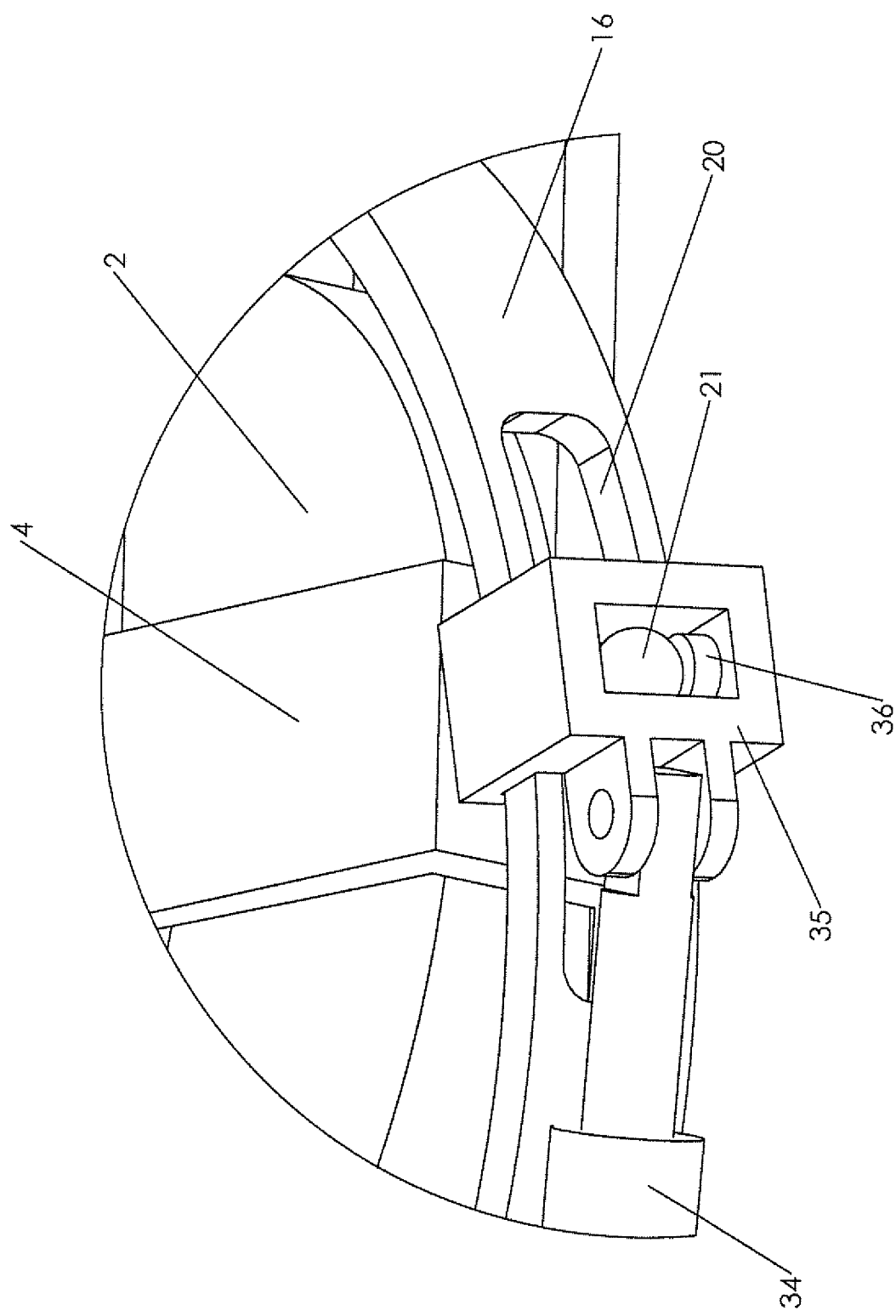
FIG. 8 is a detailed view of FIG. 7.

Referring to FIGS. 7 and 8, a preferred embodiment of the means for distributing forces between the two force application points of the rotary connection means 16 so as to reduce the resultant force on the centre of mass of the body 2 comprises two identical cylinders 36. Each cylinder 36 is mounted to one of the housings 35 such that the barrel of the cylinder 36 is rigidly mounted to the inner surface of the housing 35 and the piston rod of the cylinder 36 preferably with a spherical surface is in contact with the spherical pin 21 of the inner cradle 4 such that the pin 21 is supported for spherical motion. The bottom chambers of the two cylinders 36 are interconnected in a closed loop wherein the forces applied by the two cylinders 36 are equal. This mechanism ensures that the magnitudes of the forces applied by the rotary connection means 16 to the two pins 21 of the inner cradle 4 are substantially equal. This provides a reduction in the magnitude of the resultant force on the centre of mass of the body 2.

Figure 9:
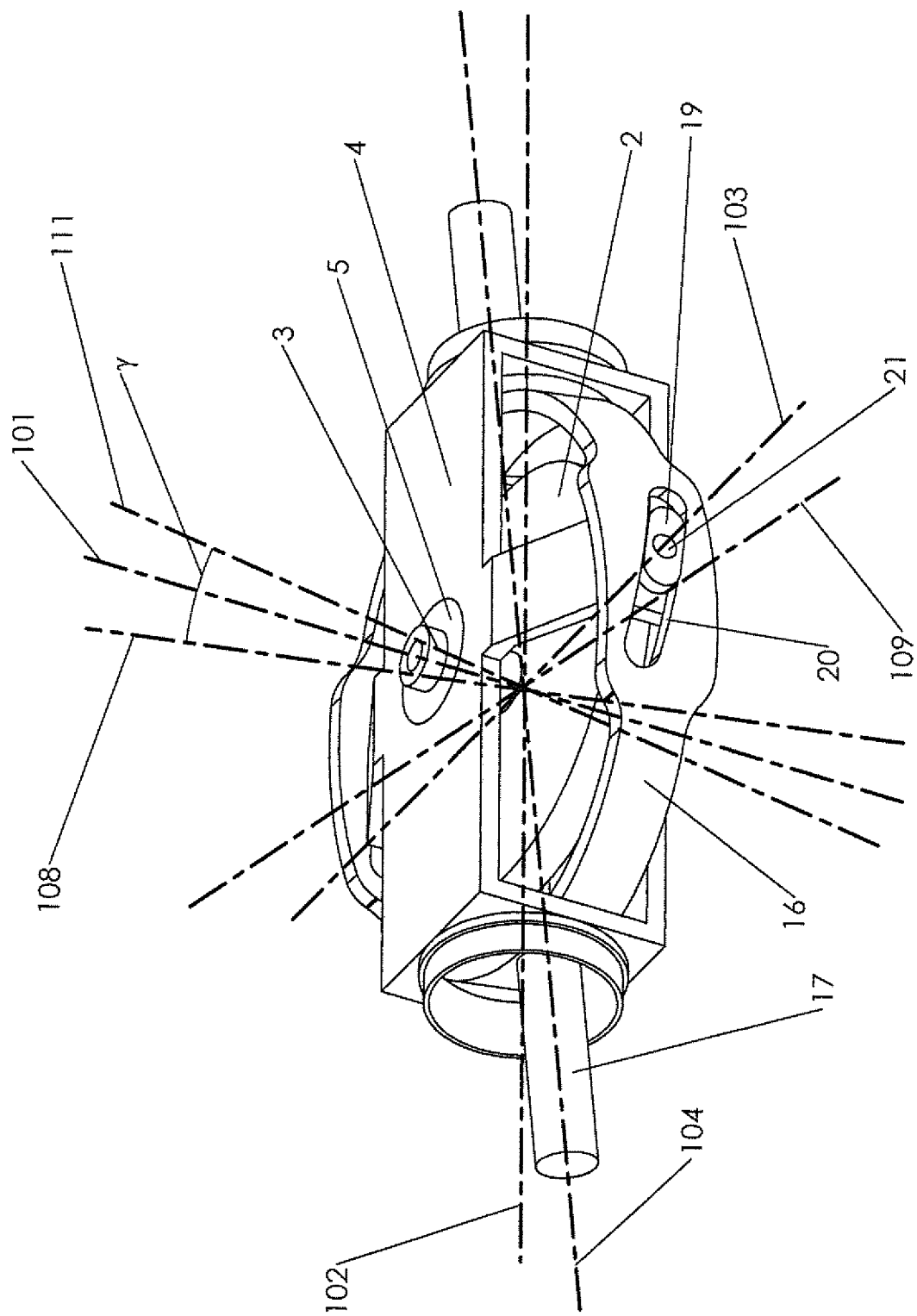
FIG. 9 shows an embodiment of rotary connection means.

Referring to FIG. 9, in another preferred embodiment of the rotary connection means 16, the orientations of the two slots 20 of the rotary connection means 16 are rotated about a ninth axis 109 by a gamma angle γ. The ninth axis 109 is defined as the axis which is perpendicular to both the fourth axis 104 and the eighth axis 108 and passes through the centre of mass of the body 2. Thus, in this arrangement, the inner cradle 4 is allowed to rotate in a limited manner with respect to the rotary connection means 16 about an eleventh axis 111 instead of the eighth axis 108. The eleventh axis 111 is the axis which is formed by rotating the eighth axis 108 about the ninth axis 109 by the gamma angle γ. The direction of the rotation of the orientations of the slots 20 is preferably determined such that the rotary connection means 16 further causes a decrease in the theta angle θ. The magnitude of this effect may be changed by changing the value of the gamma angle γ.

Figure 10:
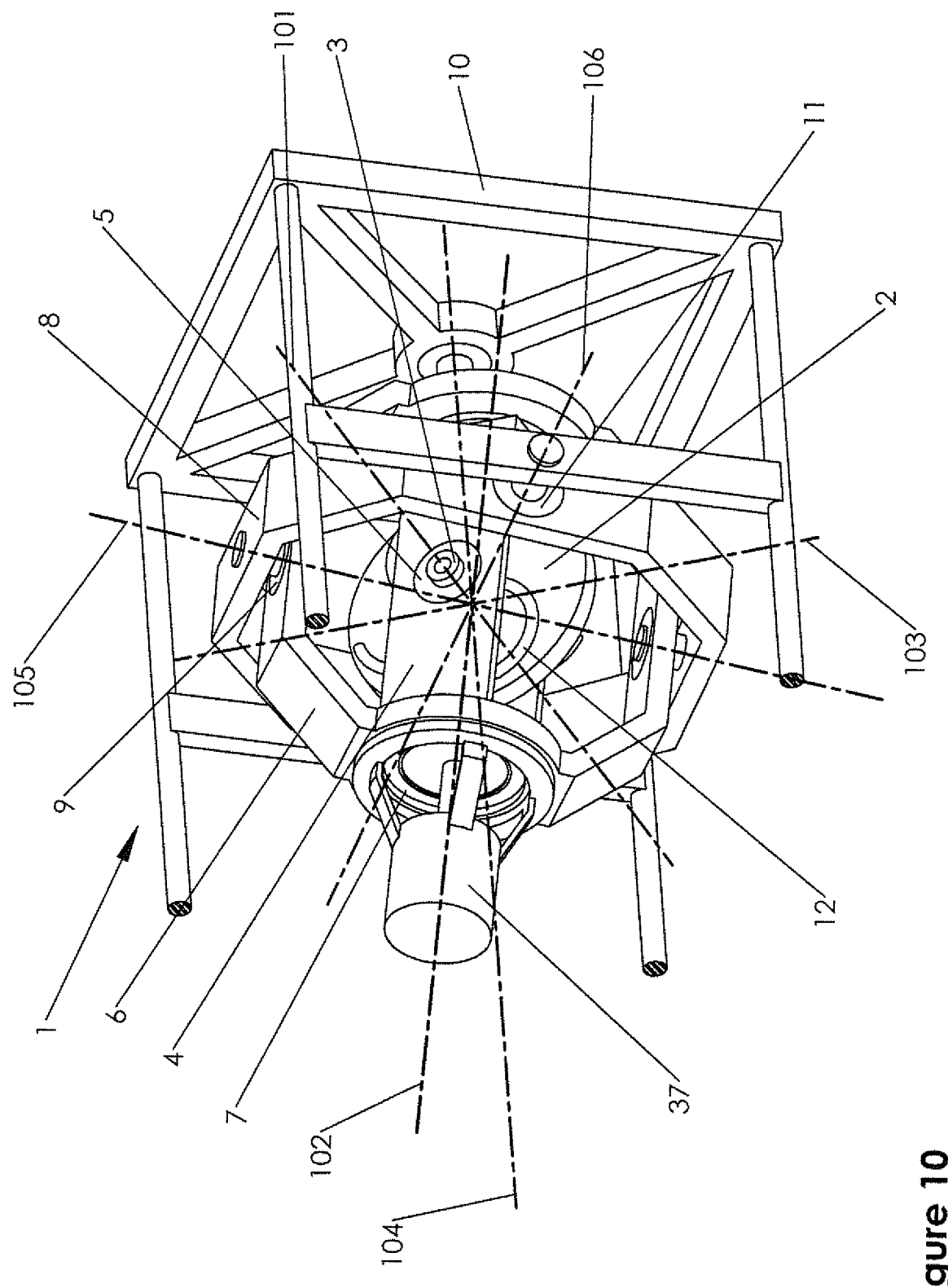
FIG. 10 shows an embodiment of means for connecting a rotation that is desired to be braked about the fourth axis to the body so as to transmit rotation and torque to the body about the second axis.

Referring to FIG. 10, another preferred embodiment of the means for connecting a rotation that is desired to be braked about the fourth axis 104 to the body 2 so as to transmit rotation and torque to the body 2 about the second axis 102 comprises a source of motive power 37. The stator part of the source of motive power 37 is rigidly coupled to the middle cradle 6 and the rotor part of the source of motive power 37 is rigidly coupled to the inner cradle 4, In this arrangement, the rotation of the stator part of the source of motive power 37 about the second axis 102 is prevented. Thus, when actuated, the source of motive power 37 applies torque to the body 2 about the second axis 102 through the inner cradle 4. The source of motive power 37 may be for instance an electrical motor or a hydraulic motor or a pneumatic motor. The power required for the source of motive power 37 is provided by the rotation that is desired to be braked. For this purpose, an electricity generator or a fluid pump which is engaged to the rotation that is desired to be braked is provided. The power obtained from the electricity generator or the fluid pump can be transferred to the source of motive power 37 by means of electrical wires or fluid conveying means such as hoses, tubes and pipes, and a rotary joint which is mounted for rotation about the fourth axis 104 within the frame 10.

Figure 11:
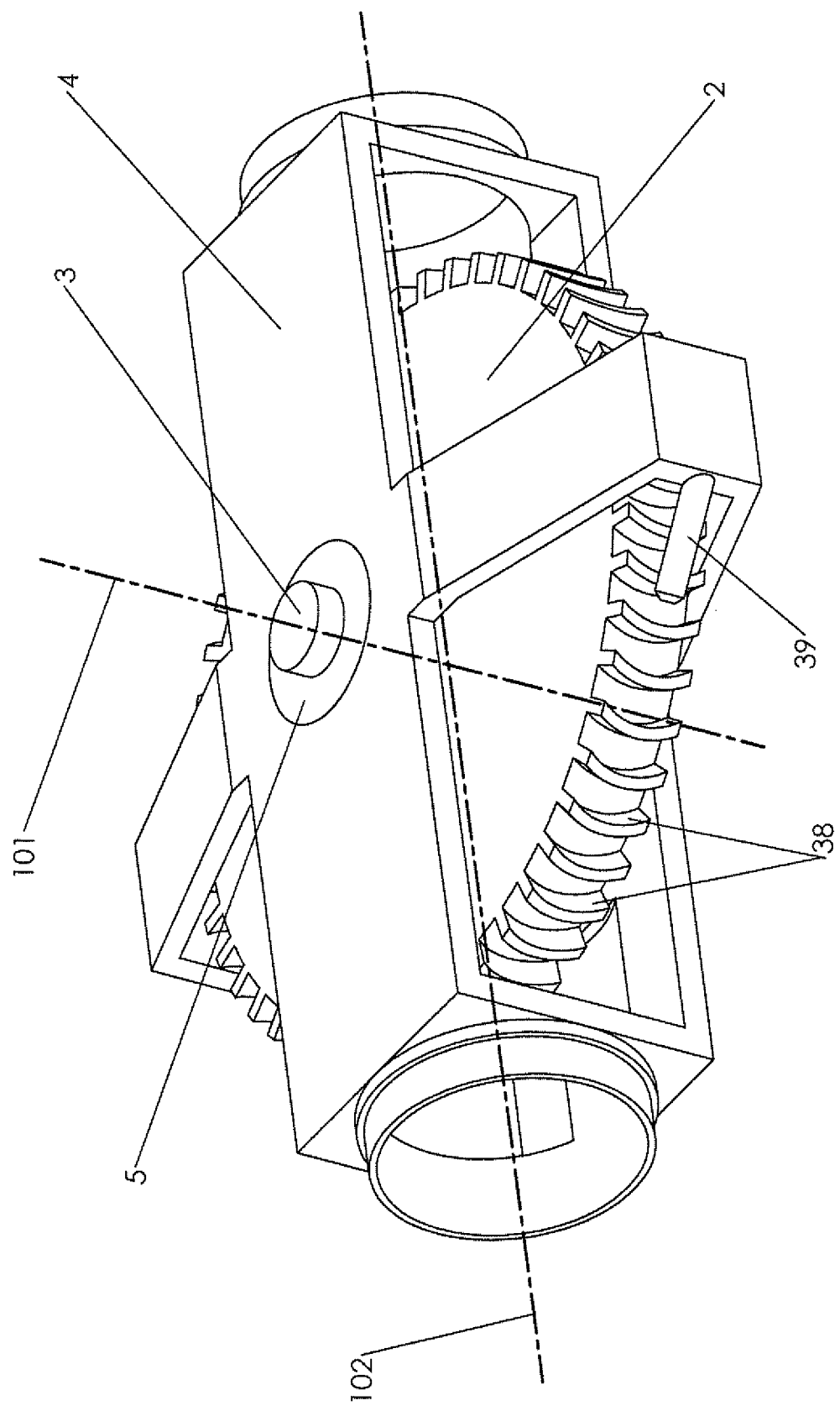
FIG. 11 illustrates an example placement of blades and nozzles according to an embodiment of means for rotating the body about the first axis.

Referring to FIG. 11, in another preferred embodiment of the means for rotating the body 2 about the first axis 101, the braking device 1 comprises a body 2 with a set of blades 38, a set of two nozzles 39 attached to the inner cradle 4, a fluid pump 14, and means (not shown) for conveying pressurized fluid to nozzles attached to the inner cradle 4. The orientations of the two nozzles 39 and the form of the blades 38 are determined such that when the pressurized fluid is projected on the blades 38 of the body 2, the fluid causes a torque to be applied to the body 2 about the first axis 101 so as to accelerate the body 2 about the first axis 101. The magnitude of the torque applied to the body 2 about the first axis 101 can be controlled by controlling the flow rate of the fluid. A second set of nozzles (not shown in FIG. 11) may also be provided so as to apply torque to the body 2 about the first axis 101 in the opposite direction, that is so as to decelerate the body 2 about the first axis 101. A valve may be provided in order to alternate the fluid between the first and the second set of nozzles.

Referring to FIG. 12, another preferred embodiment of the means for rotating the body 2 about the first axis 101 comprises a fixed outer gear 40, an inner gear 41, a transmission 42, a first bevel gear 43 and a second bevel gear 44. The fixed outer gear 40 is rigidly coupled to the middle cradle 6 and in mesh with the inner gear 41. The inner gear 41 is engaged to the input shaft of the transmission 42. The first bevel gear 43 is engaged to the output shaft of the transmission 42. The second bevel gear 44 is engaged to the rotation shaft 3 of the body 2, and also in mesh with the first bevel gear 43. This mechanism engages the rotation of the body 2 about the second axis 102 to the rotation of the body 2 about the first axis 101 such that when the body 2 is rotated about the second axis 102, the body 2 also rotates about the first axis 101. The transmission 42 is used to change the ratio of the speed of the rotation of the body 2 about the second axis 102 to the speed of the rotation of the body 2 about the first axis 101. The transmission 42 may have a fixed speed ratio or variable speed ratio. The speed ratio of the transmission 42 may be controlled by the automatic control unit 27 so as to change the speed of the rotation of the body 2 about the first axis 101.

In another preferred embodiment of the means for rotating the body 2 about the first axis 101, a source of motive power is provided so as to rotate the body 2 about the first axis 101. The source of motive power could be for instance an electrical motor or a hydraulic motor or a pneumatic motor. The power required for the source of motive power may be provided by an external power supply or by the rotation that is desired to be braked.

In a fourth, alternative embodiment, at least one of the first, second, third or fourth axes do not pass through the centre of mass of the body 2.

Figure 13:
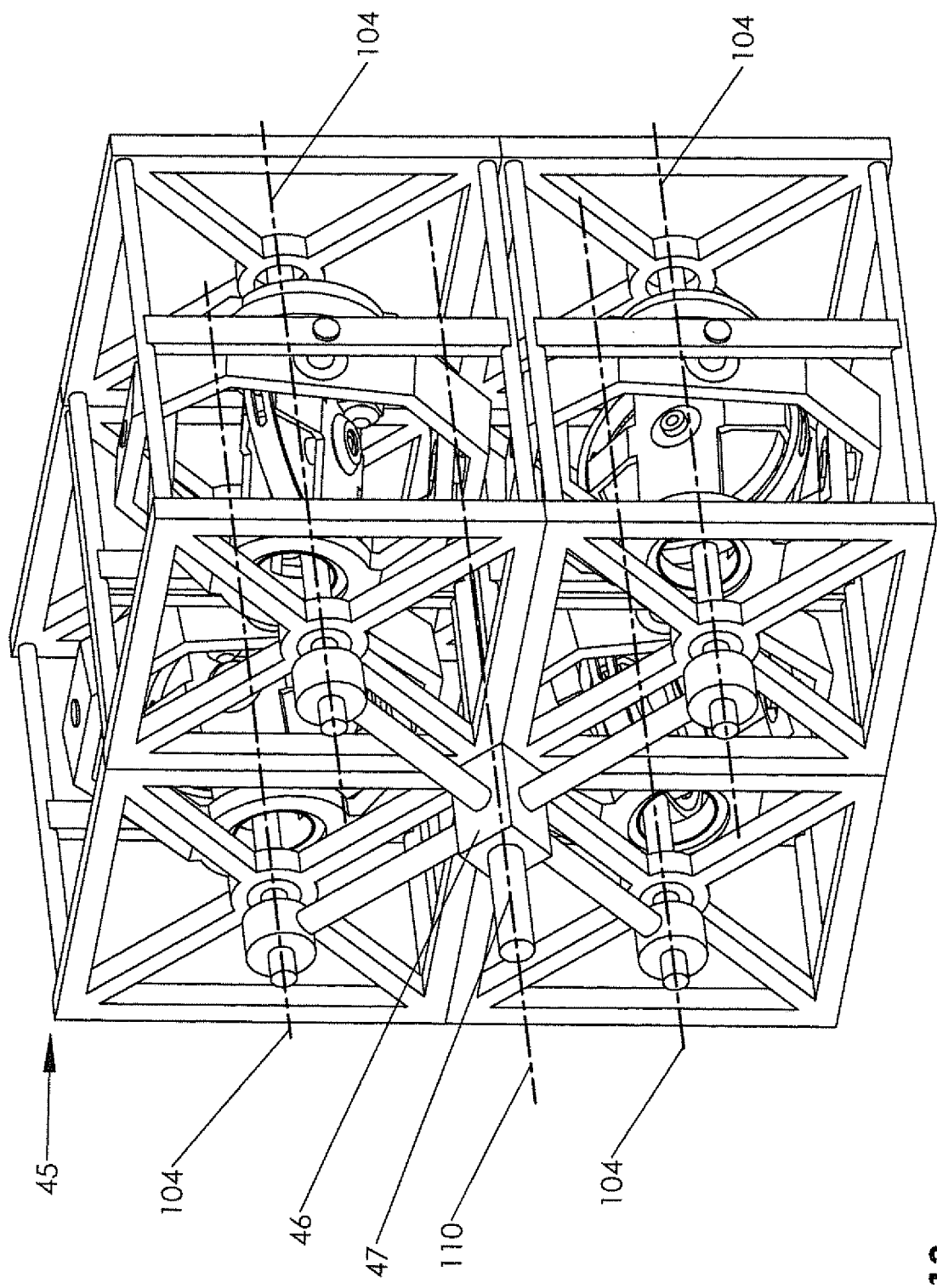
FIG. 13 shows an embodiment of an assembly of braking devices.
Figure 14:
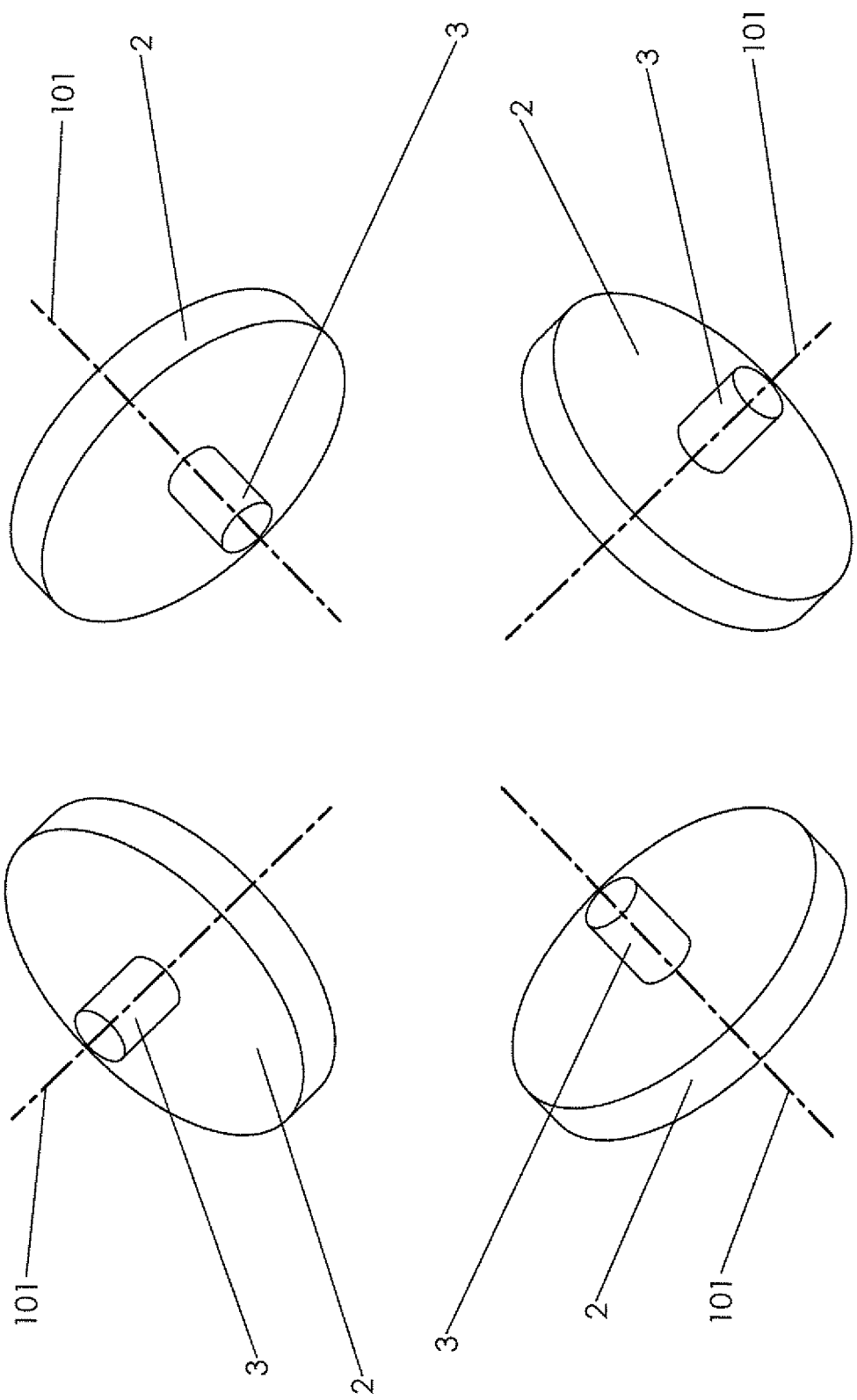
FIG. 14 is a diagram illustrating the relative orientations of the bodies in an embodiment of an assembly of braking devices at a specific instant.

Referring to FIG. 13, an embodiment of an assembly 45 of braking devices 1 is provided. The assembly 45 comprises four identical braking devices 1 arranged in a 2×2 array. The frames 10 of the braking devices 1 are rigidly coupled together such as the fourth axes 104 of the braking devices 1 are substantially parallel to each other. The assembly 45 further comprises a means 46 for distributing a rotation about a tenth axis 110 to each braking device 1 such that the shaft 47 of the means 46 for distributing a rotation is engaged to the shaft 17 of the rotary connection means 16 of each braking device 1 so as to cause the rotary connection means 16 of each braking device 1 to rotate at the same rotational speed but at different respective phase angle. The tenth axis 110 is could be any axis which is substantially parallel to the fourth axes 104 of the braking devices 1. The rotation that is desired to be braked is engaged to the shaft 47 of the means 46 for distributing a rotation. The means 46 for distributing a rotation may comprise one or more chain-sprocket mechanisms, belt-pulley mechanisms or gear mechanisms. The phase angles in this embodiment are equally spaced in order to reduce the magnitude of the internal resultant torque. For instance, if the phase angle of the upper left braking device 1 is assumed to be 0 degrees, the phase angle of the lower left braking device would be 90 degrees, the phase angle of the lower right braking device would be 180 degrees, and the phase angle of the upper right braking device would be 270 degrees. The relative orientations of the bodies 2 of the braking devices 1 at a specific instant are illustrated in FIG. 14. The means 46 for distributing a rotation ensures that the rotations of the rotary connection means 16 of braking devices 1 are synchronized so as to preserve the relative orientations of the bodies 2 of the braking devices 1. This arrangement reduces the vibrations occurred in the assembly 45. The magnitude of the braking torque provided by the assembly 45 is the sum of the braking torques provided by each of the braking devices 1 in the assembly 45.

KEY OF REFERENCE SIGNS

1. Braking device
2. Body
3. Rotation shaft
4. Inner cradle
5. Inner bearings
6. Middle cradle
7. Middle bearings
8. Outer cradle
9. Outer bearings
10. Frame
11. Frame bearings
12. First set of fluid pipes
13. Second set of fluid pipes
14. Fluid pump
16. Rotary connection means
17. Shaft of the rotary connection means
18. Rotary connection means bearings
19. Sliding part
20. Slots of the rotary connection means
21. Spherical pins
22. Limiting arm
23. First rod of the limiting arm
24. Second rod of the limiting arm
25. First limiting arm bearings
26. Second limiting arm bearings
27. Automatic control unit
28. Guidance pin
29. Guidance slot
30. Guidance arm
31. Innermost cradle
32. Innermost bearings
33. Actuator for rotating the innermost cradle
34. Cylinders of the means for reducing the effect of frictional forces
35. Housings
36. Cylinders of the means for distributing force
37. Source of motive power
38. Blades of the body
39. Nozzles
40. Outer gear
41. Inner gear
42. Transmission 43. First bevel gear
44. Second bevel gear
45. Assembly of braking devices
46. Means for distributing a rotation
47. Shaft of the means for distributing a rotation
101. First axis
102. Second axis
103. Third axis
104. Fourth axis
105. Fifth axis
106. Sixth axis
107. Seventh axis
108. Eighth axis
109. Ninth axis
110. Tenth axis
111. Eleventh axis
α Alpha angle
β Beta Angle
γ Gamma Angle
θ Theta Angle
N Normal line of the plane which contains the second axis and the fourth axis

What is claimed is:

1. A braking device comprising:
a body mounted for rotation about a first axis;
means for rotating the body about the first axis;
characterised in that
the braking device comprises a second axis, a third axis and a fourth axis, the braking device being configured as to enable the body to further rotate about the second axis and the third axis, the first axis being oriented with respect to the second axis at an alpha angle (α) which is greater than 0 degrees, the second axis being oriented with respect to the fourth axis at a beta angle (β) which is greater than 0 degrees and less than 90 degrees, the third axis being the precession axis about which the precession of the body occurs as a result of rotating the body about the first axis and applying torque to the body about the second axis, wherein the second axis is allowed to rotate about the fourth axis independently of rotation of the body about the second axis, and the body is allowed to rotate about the second axis independently of rotation of the second axis about the fourth axis;
the braking device further comprises
means for connecting a rotation that is desired to be braked about the fourth axis to the body so as to transmit rotation and torque to the body about the second axis;
whereby the rotation of the body about the first axis and the torque applied to the body about the second axis together cause the body to further rotate about the third axis, the body rotates about the first axis, the second axis and the third axis simultaneously, the rotation of the body about the first axis and the rotation of the body about the third axis together cause a braking torque to occur about the second axis;
thereby to obtain braking torque against the rotation that is desired to be braked about the fourth axis.

2. A braking device as claimed in claim 1, further comprising an inner cradle, a middle cradle and a frame.

3. A braking device as claimed in claim 2, further comprising an outer cradle wherein the body is mounted for rotation about the first axis within the inner cradle, the inner cradle is mounted for rotation about the second axis within the middle cradle, the middle cradle is mounted for rotation about a fifth axis within the outer cradle, and the outer cradle is mounted for rotation about a sixth axis within the frame.

4. A braking device as claimed in claim 2, further comprising means for preventing rotation of the middle cradle about the second axis wherein the body is mounted for rotation about the first axis within the inner cradle, the inner cradle is mounted for rotation about the second axis within the middle cradle, the middle cradle is mounted for spherical motion within the frame, and rotation of the middle cradle about the second axis is prevented.

5. A braking device as claimed in claim 4, further comprising fluid bearing means that supports the middle cradle for spherical motion within the frame.

6. A braking device (1) as claimed in claim 2, further comprising an innermost cradle wherein the body is mounted for rotation about the first axis within the innermost cradle, the innermost cradle is mounted for rotation about a seventh axis within the inner cradle, and rotation of the innermost cradle about the seventh axis causes a change in the alpha angle (α).

7. A braking device (1) as claimed in claim 2, further comprising fluid bearing means so as to support one or more of: the body, the innermost cradle, the inner cradle, the middle cradle, and the outer cradle.

8. A braking device (1) as claimed in claim 1, further comprising means for controlling the alpha angle (α).

9. A braking device as claimed in claim 8, wherein the means for controlling the alpha angle (α) comprises means for rotating the innermost cradle about the seventh axis.

10. A braking device as claimed in claim 1, further comprising means for controlling the beta angle (β).

11. A braking device as claimed in claim 10, wherein the means for controlling the beta angle (β) comprises means for limiting motion of the second axis such that the beta angle (β) is constant at a selected value, and the second axis is allowed to rotate about the fourth axis.

12. A braking device as claimed in claim 11, wherein the means for limiting motion of the second axis comprises actuator means so as to adjust the beta angle (β).

13. A braking device as claimed in claim 1, wherein the means for connecting a rotation that is desired to be braked about the fourth axis to the body so as to transmit rotation and torque to the body about the second axis comprises rotary connection means, the rotary connection means is mounted for rotation about the fourth axis, the rotary connection means is engaged to the rotation that is desired to be braked about the fourth axis, and the rotary connection means is so structured as to apply torque to the body about the second axis when the rotary connection means is rotated about the fourth axis.

14. A braking device as claimed in claim 13, wherein the rotary connection means comprises means for reducing the effect of frictional forces that occur on the contact surfaces of the rotary connection means and the structure through which the rotary connection means applies torque to the body.

15. A braking device as claimed in claim 14, wherein the means for reducing the effect of frictional forces comprises one or more actuators which are mounted to the rotary connection means and arranged to apply force to the structure through which the rotary connection means applies torque to the body so as to reduce the effect of the frictional forces.

16. A braking device as claimed in claim 13, wherein the rotary connection means comprises means for distributing force between the two force application points of the rotary connection means so as to reduce the magnitude of the resultant force on the centre of mass of the body.

17. A braking device as claimed in claim 16, wherein the means for distributing force between the two force application points of the rotary connection means comprises two cylinders, the cylinders are mounted to the rotary connection means so as to apply force to the structure through which the rotary connection means applies torque to the body, bottom chambers of the cylinders are interconnected in a closed loop, and the forces applied by the two cylinders are equal.

18. A braking device as claimed in claim 13, wherein the structure through which the rotary connection means applies torque to the body is the inner cradle or the innermost cradle.

19. A braking device as claimed in claim 2, wherein the means for connecting a rotation that is desired to be braked about the fourth axis to the body so as to transmit rotation and torque to the body about the second axis comprises a source of motive power wherein the stator part of the source of motive power is rigidly coupled to the middle cradle and the rotor part of the source of motive power is rigidly coupled to the inner cradle, the power required for the source of motive power is provided by the rotation that is desired to be braked whereby the rotation of the stator part of the source of motive power about the second axis is prevented, and the source of motive power applies torque to the body about the second axis.

20. A braking device as claimed in claim 1, further comprising means for controlling the ratio of the speed of the rotation that is desired to be braked to the speed of the rotation of the body about the second axis.

21. A braking device as claimed in claim 20, wherein means for controlling the ratio of the speed of the rotation that is desired to be braked to the speed of the rotation of the body about the second axis comprises transmission means such that the rotation that is desired to be braked is engaged to the input shaft of the transmission means, and the means for connecting a rotation that is desired to be braked about the fourth axis to the body so as to transmit rotation and torque to the body about the second axis is engaged to the output shaft of the transmission means.

22. A braking device as claimed in claim 1, wherein the means for rotating the body about the first axis comprises one or more of: an electrical motor; a hydraulic motor; and a pneumatic motor.

23. A braking device as claimed in claim 1, wherein the body comprises one or more blades.

24. A braking device as claimed in claim 23, wherein the means for rotating the body about the first axis comprises means for pumping fluid, and means for projecting fluid onto the blades of the body so as to rotate the body about the first axis.

25. A braking device as claimed in claim 1, wherein the body comprises one or more fluid pipes or channels.

26. A braking device as claimed in claim 25, wherein the means for rotating the body about the first axis comprises means for pumping fluid into one or more fluid pipes or channels of the body such that as the fluid exits from nozzles of the pipes or channels, the body is rotated about the first axis as a result of the reaction of the fluid.

27. A braking device as claimed in claim 1, wherein the power required for the means for rotating the body about the first axis is provided by the rotation that is desired to be braked.

28. A braking device as claimed in claim 1, further comprising means for controlling the means for rotating the body about the first axis so as to control the speed of the rotation of the body about the first axis.

29. A braking device as claimed in claim 1, wherein the means for rotating the body about the first axis comprises mechanical engaging means for engaging the rotation of the body about the second axis to the rotation of the body about the first axis whereby when the body is rotated about the second axis, the body also rotates about the first axis.

30. A braking device as claimed in claim 29, wherein the mechanical engaging means comprises transmission means so as to change the speed of the rotation of the body about the first axis.

31. A braking device as claimed in claim 1, further comprising one or more sensors for measuring values of one or more of the following parameters: the speed of the rotation of the body about the first axis; the speed of the rotation of the means for connecting a rotation that is desired to be braked about the fourth axis to the body so as to transmit rotation and torque to the body about the second axis; the alpha angle ($\alpha$); the beta angle ($\beta$); the magnitude of the braking torque; the speed of the rotation that is desired to be braked.

32. A braking device as claimed in claim 1, further comprising a controller with an automatic control unit that controls one or more of: the speed of the rotation of the body about the first axis; the alpha angle ($\alpha$); the beta angle ($\beta$); and the ratio of the speed of the rotation that is desired to be braked to the speed of the rotation of the body about the second axis.

33. A braking device as claimed in claim 1, further comprising means for controlling the magnitude of the braking torque.

34. The braking device as claimed in claim 33, wherein the magnitude of the braking torque is controlled by controlling one or more of: the speed of the rotation of the body about the first axis; the alpha angle ($\alpha$); and the ratio of the speed of the rotation that is desired to be braked to the speed of the rotation of the body about the second axis.

35. A braking device as claimed in claim 1, further comprising means for moving the body to a position where the first axis and the fourth axis are parallel or coincident when braking torque is not needed whereby the magnitudes of the internal forces which occur inside the braking device are reduced.

36. A braking device as claimed in claim 1, wherein the alpha angle ($\alpha$) is set to 90 degrees.

37. The braking device as claimed in claim 1, wherein the centre of mass of the body is on the fourth axis.

38. A braking device as claimed in claim 1, wherein the first axis, the second axis, the third axis and the fourth axis intersect at the centre of mass of the body.

39. A braking device as claimed in claim 1, wherein each of the first axis, the second axis and the third axis are perpendicular to the other two axes.

40. A braking device as claimed in claim 1, wherein the braking device provides a continuous, preferably constant, braking torque against the rotation that is desired to be braked about the fourth axis.

41. An assembly of two or more braking devices, each of which comprises a braking device as claimed in claim 1, in combination with means for distributing the rotation that is desired to be braked to each braking device so as to rotate each of the means for connecting a rotation that is desired to be braked about the fourth axis to the body so as to transmit rotation and torque to the body about the second axis at the same rotational speed but at different respective phase angles wherein the magnitudes of the unbalanced forces in the assembly are reduced whereby the vibrations occurred in the assembly are reduced and the magnitude of the braking torque provided by the assembly is the sum of the braking torques provided by each of the braking devices in the assembly.

42. A method of generating braking torque in a braking device comprising a first axis, a second axis, and a third axis, the method comprising:
mounting a body for rotation about the first axis, the second axis and the third axis;
rotating the body about the first axis;
characterised in that
the braking device further comprises a fourth axis, the first axis being oriented with respect to the second axis at an alpha angle ($\alpha$) which is greater than 0 degrees, the second axis being oriented with respect to the fourth axis at a beta angle ($\beta$) which is greater than 0 degrees and less than 90 degrees, the third axis being the precession axis about which the precession of the body occurs as a result of rotating the body about the first axis and applying torque to the body about the second axis wherein the second axis is allowed to rotate about the fourth axis independently of rotation of the body about the second axis and the body is allowed to rotate about the second axis independently of rotation of the second axis about the fourth axis;
the method further comprises the step of
connecting a rotation that is desired to be braked to the fourth axis so as to transmit rotation and torque to the body about the second axis;
whereby the rotation of the body about the first axis and the torque applied to the body about the second axis together cause the body to further rotate about the third axis, the body rotates about the first axis, the second axis and the third axis simultaneously, however, the rotation of the body about the second axis and the rotation of the body about the third axis are observed as if the body rotates about the fourth axis, the rotation of the body about the first axis and the rotation of the body about the third axis together cause a braking torque to occur about the second axis;
thereby to obtain braking torque against the rotation that is desired to be braked about the fourth axis.

43. A method as claimed in claim 42, further comprising adjusting the magnitude of the braking torque.

44. A method as claimed in claim 43, wherein the step of adjusting the magnitude of the braking torque comprises adjusting one or more of: the speed of the rotation of the body about the first axis; the alpha angle ($\alpha$); and the ratio of the speed of the rotation that is desired to be braked to the speed of the rotation of the body about the second axis.

45. A method as claimed in claim 42, further comprising removing the braking torque when the braking torque is not needed.

46. A method as claimed in claim 45, wherein the step of removing the braking torque comprises moving the body to a position where the first axis and the fourth axis are parallel or coincident.

47. A method as claimed in claim 45, wherein the step of removing the braking torque comprises disconnecting the rotation that is desired to be braked from the body.

48. A method as claimed in claim 45, wherein the step of removing the braking torque comprises adjusting the alpha angle ($\alpha$) and/or the beta angle ($\beta$) to 0 degrees.

49. A method as claimed in claim 45, wherein the step of removing the braking torque comprises stopping the rotation of the body about the first axis.

50. A method as claimed in claim 42, wherein a continuous, preferably constant, braking torque is provided against the rotation that is desired to be braked about the fourth axis.

\* \* \* \* \*